(12) United States Patent
Chen et al.

(10) Patent No.: US 12,448,372 B2
(45) Date of Patent: Oct. 21, 2025

(54) CLASS OF TRIAROMATIC COMPOUNDS TARGETING BIFUNCTIONAL PHOSPHORYLATION SITE OF STAT3 AND APPLICATIONS THEREOF

(71) Applicant: SHANGHAI YUYAO BIOTECH LTD., Shanghai (CN)

(72) Inventors: Yihua Chen, Shanghai (CN); Wenbo Zhou, Shanghai (CN); Huang Chen, Shanghai (CN); Zhengfang Yi, Shanghai (CN); Xiufeng Pang, Shanghai (CN); Mingyao Liu, Shanghai (CN)

(73) Assignee: SHANGHAI YUYAO BIOTECH LTD., Shanghai (CN)

( * ) Notice: Subject to any disclaimer, the term of this patent is extended or adjusted under 35 U.S.C. 154(b) by 903 days.

(21) Appl. No.: 17/631,755

(22) PCT Filed: Jul. 16, 2020

(86) PCT No.: PCT/CN2020/102461
§ 371 (c)(1),
(2) Date: Jan. 31, 2022

(87) PCT Pub. No.: WO2021/017880
PCT Pub. Date: Feb. 4, 2021

(65) Prior Publication Data
US 2022/0274972 A1    Sep. 1, 2022

(30) Foreign Application Priority Data
Jul. 31, 2019 (CN) .......................... 201910698892.X

(51) Int. Cl.
*A61P 1/04* (2006.01)
*A61K 31/497* (2006.01)
(Continued)

(52) U.S. Cl.
CPC ............ *C07D 413/14* (2013.01); *A61K 45/06* (2013.01); *A61P 35/00* (2018.01)

(58) Field of Classification Search
CPC .... C07D 413/14; A61K 45/06; A61K 31/497; A61P 35/00; A61P 1/04; A61P 11/00;
(Continued)

(56) References Cited

U.S. PATENT DOCUMENTS

2010/0261720 A1 * 10/2010 Sumida .................. A61P 19/08
514/253.01

FOREIGN PATENT DOCUMENTS

CN       101842367 A    9/2010
CN       104736535 A    6/2015
(Continued)

OTHER PUBLICATIONS

Yang, L. et al. Cytokine and Growth Factor Reviews, 2019, 49, 10-22 (Year: 2019).*
(Continued)

*Primary Examiner* — Clinton A Brooks
*Assistant Examiner* — Kendall Nicole Heitmeier
(74) *Attorney, Agent, or Firm* — NKL Law; Bin Lu; Allen Xue

(57) ABSTRACT

Disclosed is a class of triaromatic compounds targeting a bifunctional phosphorylation site of STAT3, such as compounds represented by formulas (I) to (V), or pharmaceutically acceptable salts, hydrates, solvates, metabolites or prodrugs thereof. Further proposed are pharmaceutical compositions comprising the compounds represented by formulas (I) to (V). Further proposed are applications of the triaromatic compounds in the preparation of drugs for preventing and/or treating diseases caused or regulated by activation of the bifunctional phosphorylation site of STAT3.

15 Claims, 5 Drawing Sheets

(51) Int. Cl.
  *A61K 45/06* (2006.01)
  *A61P 11/00* (2006.01)
  *A61P 13/12* (2006.01)
  *A61P 17/06* (2006.01)
  *A61P 19/02* (2006.01)
  *A61P 29/00* (2006.01)
  *A61P 35/00* (2006.01)
  *A61P 37/02* (2006.01)
  *C07D 413/14* (2006.01)

(58) Field of Classification Search
  CPC .......... A61P 13/12; A61P 17/06; A61P 19/02; A61P 29/00; A61P 37/02
  See application file for complete search history.

(56) References Cited

FOREIGN PATENT DOCUMENTS

| | | | |
|---|---|---|---|
| JP | 2010275302 | A | 12/2010 |
| JP | 2011502115 | A | 1/2011 |
| JP | 2015526478 | A | 9/2015 |
| WO | 2009057811 | A2 | 5/2009 |
| WO | 2014031936 | A2 | 2/2014 |

OTHER PUBLICATIONS

Ashton et al., "Oxidative Phosphorylation as an Emerging Target in Cancer Therapy", Clincal Cancer Res., Jun. 1, 2018, p. 2482-2490.
Molina et al., "An inhibitor of oxidative phosphorylation exploits cancer vulnerability" Nature Medicine, 2018.
Lissanu Deribe et al., "Mutations in the SWI/SNF complex induce a targetable dependence on oxidative phosphorylation in lung cancer", Nature Medicine., 2018.
Zhang et al., "Metabolic reprogramming toward oxidative phosphorylation identifies a therapeutic target for mantle cell lymphoma", Science Translational Medicine, May 8, 2019.
Fischer et al., "Molecular Profiling Reveals Unique Immune and Metabolic Features of Melanoma Brain Metastases", Cancer Discovery, Feb. 20, 2019, pp. 629-645.
David Genini et al., "Mitochondrial dysfunction induced by a SH2 domain-targeting STAT3 inhibitor leads to metabolic synthetic lethality in cancer cells", PNAS, 2017.
Zhang, Mingming et al., "Identification and characterization of small molecule inhibitors of signal transducer and activator of transcription 3 (STAT3) signaling pathway by virtual screening", Bioorganic & Medicinal Chemistry Letters, Apr. 1, 2013, vol. 23, No. 07, pp. 2225-2229.
Huang, Qiuyao et al., "Revisiting signal transducer and activator of transcription 3 (STAT3) as an anticancer target and its inhibitor discovery: Where are we and where should we go?", European Journal of Medicinal Chemistry, Feb. 1, 2020, vol. 187, pp. 1-20.

* cited by examiner

CLASS OF TRIAROMATIC COMPOUNDS TARGETING BIFUNCTIONAL PHOSPHORYLATION SITE OF STAT3 AND APPLICATIONS THEREOF

TECHNICAL FIELD

The present invention relates to the field of pharmaceutical technology, specifically to a class of efficient and novel triaromatic compound and related analogs specific targeting inhibition of STAT3 bifunctional phosphorylation site, and to the application of such compounds or pharmaceutical compositions containing the compounds in the preparation of drugs for the treatment of various malignancies and tumor metastasis related diseases.

BACKGROUND

Mitochondria are intracellular factories of energy and metabolites, which are important components in maintaining the vital activities of the organism. Under normal physiological conditions, the organism provides energy and metabolites through oxidative phosphorylation of mitochondria, while in tumor cells, this process is mainly accomplished through glycolysis. Recent studies have revealed that oxidative phosphorylation of mitochondria is also involved in glycolysis (aerobic glycolysis) in tumor cells; and mutations in oncogenes and drug resistance in tumor cells can cause elevated levels of oxidative phosphorylation. These breakthroughs in basic research have made it possible to treat tumors by targeting oxidative phosphorylation in mitochondria (Ashton et al., Clin Cancer Res., 2018). Recent literature reported the first high-affinity inhibitor of mitochondrial oxidative phosphorylation, IACS-010759, which inhibits mitochondrial oxidative phosphorylation function mainly by directly targeting respiratory chain complex 1. Currently, IACS-010759 have shown potent antitumor effects in blood tumor and glioma (Molina et al., Nat Med., 2018), lung cancer, and cancer cells with SWI/SNF mutations (Lissanu Deribe et al., Nat Med., 2018), drug-resistant set of mantle cell lymphoma (Zhang et al., Sci Transl Med., 2019), and drug-resistant and brain metastatic melanoma (Fischer et al., Cancer Discov., 2019). Although this compound is currently in phase I clinical studies, the discoverers of IACS-010759 also reported data that the compound was highly intolerant in model mice at an administered dose of 25 mg/kg and that all mice in the administered group died; it was hypothesized that such toxicity was mainly due to the direct targeting of respiratory chain complex 1 and inhibition of mitochondrial oxidative phosphorylation by the compound. Therefore, we propose the possibility of investigating a novel class of compounds that can provide superior antitumor effects by indirectly inhibiting mitochondrial respiratory chain complex 1 and thus targeting mitochondrial oxidative phosphorylation, while reducing the potential toxicity of the candidate compounds.

STAT3 is an oncogene in the STATs family that has been shown to be intimately involved in the development of a variety of tumors, wherein numerous publications reported continuous activation of STAT3 is associated with poor prognosis of tumors. The activation of STAT3 is mainly dependent on the phosphorylation of two sites, the tyrosine at position 705 ($STAT3^{Y705}$) and serine at position 727 ($STAT3^{S727}$) in C-terminal transcriptional activation domain, wherein the $STAT3^{Y705}$ site mainly regulates the classical STAT3 signaling pathway, entering into the nucleus to participate in antitumor effects (classical STAT3 signaling pathway). In 2009, Science published an article reporting a non-classical STAT3 signaling pathway, and reported that inhibiting phosphorylation of $STAT3^{S727}$ site can indirectly inhibit the function of mitochondrial respiratory chain complex 1 and thus inhibit mitochondrial oxidative phosphorylation to exert anti-tumor effects.

The existing STAT3 inhibitors inhibit the transcriptional activity of STAT3 mainly by modulating the STAT3 classical signaling pathway and targeting the $STAT3^{Y705}$ site, but clinical results and related articles indicate that their in vivo antitumor activity is weak and their application prospects are limited.

SUMMARY OF THE INVENTION

In view of the toxic side effects of existing inhibitors that directly target mitochondrial oxidative phosphorylation, the purpose of the present invention is to provide a class of novel, safe and efficient triaromatic compound as STAT3 bifunctional phosphorylation inhibitors for the development of antitumor drugs.

The present invention disclosed a triaromatic compound targeting bifunctional phosphorylation site of STAT3, comprising compound of formula (I) or pharmaceutically acceptable salts, metabolites or prodrugs thereof;

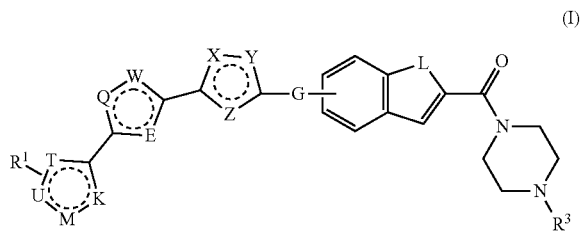

(I)

wherein
X, Y, Z, W, Q, E, T, U, M and K are each independently selected from one of CH, CH=CH, CH=NH, NH, N, O or S;
G and L are each independently selected from one of $CH_2$, NH, $NR_2$, O, or S;
$R^1$, $R^2$ and $R^3$ are each independently selected from hydrogen, hydroxyl, phenyl, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —N$R^5R^6$, or —C(O)N$R^6$; wherein optionally, the 5-10 membered heteroaryl is substituted with one or more substituents selected from halogen, hydroxyl, cyano, nitro, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —N$R^5R^6$, or —C(O)N$R^6$; wherein $R^4$, $R^5$, and $R^6$ are each independently hydrogen or $C_{1-4}$alkyl, p is 0, 1, or 2.

In the present invention, when G is attached to the position 6 in the group

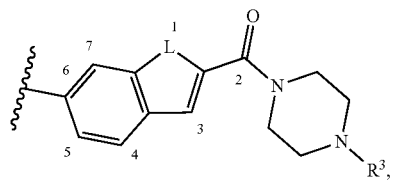

the structure of the compound of formula (I) is represented by formula (II):

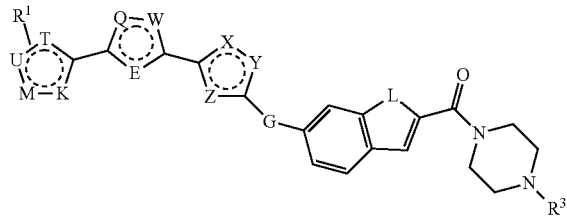

(II)

wherein

X, Y, Z, W, Q, E, T, U, M and K are each independently selected from one of CH, CH=CH, CH=NH, NH, N, O or S;

G and L are each independently selected from one of CH$_2$, NH, NR$^2$, O, or S;

R$^1$, R$^2$ and R$^3$ are each independently selected from hydrogen, hydroxyl, phenyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, or —C(O)NR$^6$; wherein optionally, the 5-10 membered heteroaryl is substituted with one or more substituents selected from halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, or —C(O)NR$^6$; wherein R$^4$, R$^5$, and R$^6$ are each independently hydrogen or C$_{1-4}$alkyl, p is 0, 1, or 2.

In formula (II) of the present invention, any one of aromatic ring in the triaromatic ring

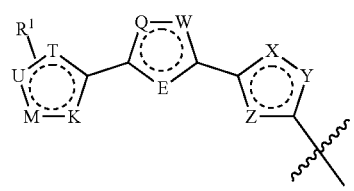

may be independently selected from, for example, phenyl, pyridyl, 1,2,4-triazolyl, 1,2,3-triazolyl, 1,2,5-triazolyl, 1,2,3,4-tetrazolyl, thienyl, pyrazolyl, pyrazinyl, pyridazinyl, pyrimidinyl, pyrrolyl, 1,3,4-oxadiazolyl, 1,2,4-oxadiazolyl, furazanyl, imidazolyl, furanyl, oxazolyl, isoxazolyl, thiazolyl, isothiazolyl, pyranyl.

In the present invention, when X is CH, Y is N, and Z is CH=NH, the structure of the compound of formula (III) is represented by formula (III):

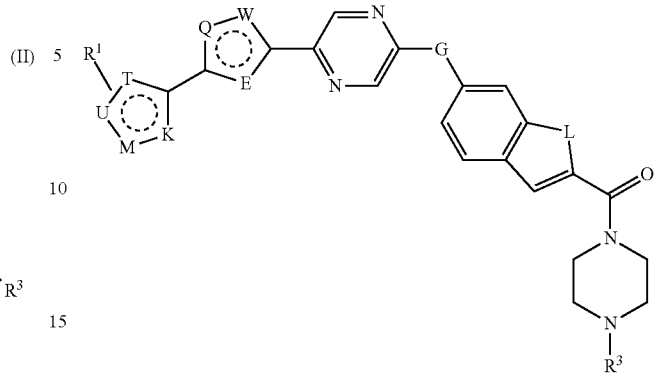

(III)

wherein

W, Q, E, T, U, M and K are each independently selected from one of CH, CH=CH, CH=NH, NH, N, O or S;

G and L are each independently selected from one of NH, NR$^2$, O, or S;

R$^1$, R$^2$ and R$^3$ are each independently selected from hydrogen, hydroxyl, phenyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, or —C(O)NR$^6$; wherein optionally, the 5-10 membered heteroaryl is substituted with one or more substituents selected from halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, or —C(O)NR$^6$; wherein R$^4$, R$^5$, and R$^6$ are each independently hydrogen or C$_{1-4}$alkyl, p is 0, 1, or 2.

In formula (III) of the present invention, any one of aromatic ring in the biaromatic ring

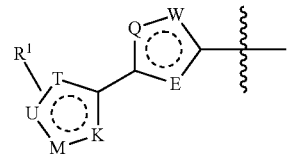

may be independently selected from, for example, phenyl, pyridyl, 1,2,4-triazolyl, 1,2,3-triazolyl, 1,2,5-triazolyl, 1,2,3,4-tetrazolyl, thienyl, pyrazolyl, pyrazinyl, pyridazinyl, pyrimidinyl, pyrrolyl, 1,3,4-oxadiazolyl, 1,2,4-oxadiazolyl, furazanyl, imidazolyl, furanyl, oxazolyl, isoxazolyl, thiazolyl, isothiazolyl, pyranyl.

In the present invention, when W is O, and Q and E are N, the structure of the compound of formula (III) is represented by formula (IV):

(IV)

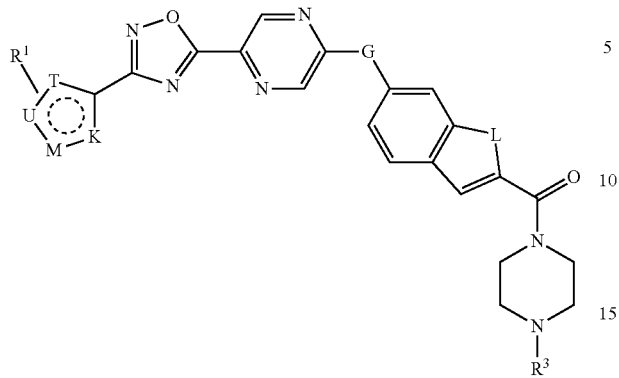

is

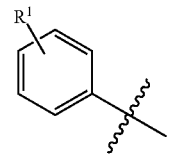

the structure of the compound of formula (IV) is represented by formula (V):

(V)

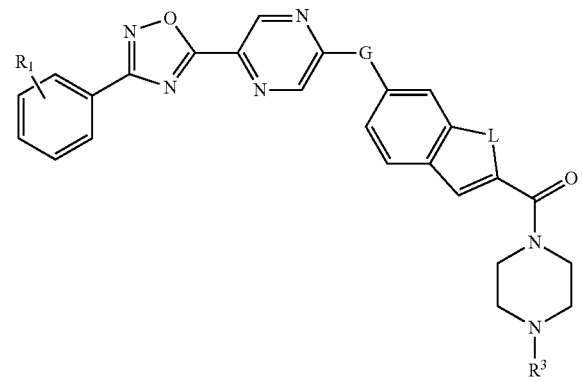

wherein

T, U, M and K are each independently selected from one of CH, CH=CH, CH=NH, NH, N, O or S;

G and L are each independently selected from one of NH, $NR^2$, O, or S;

$R^1$, $R^2$ and $R^3$ are each independently selected from hydrogen, hydroxyl, phenyl, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —NR$^5$R$^6$, or —C(O)NR$^6$; wherein optionally, the 5-10 membered heteroaryl is substituted with one or more substituents selected from halogen, hydroxyl, cyano, nitro, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —NR$^5$R$^6$, or —C(O)NR$^6$; wherein $R^4$, $R^5$, and $R^6$ are each independently hydrogen or $C_{1-4}$alkyl, p is 0, 1, or 2.

In formula (V) of the present invention, aromatic ring

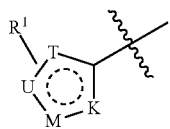

can be independently selected from, for example, phenyl, pyridyl, 1,2,4-triazolyl, 1,2,3-triazolyl, 1,2,5-triazolyl, 1,2,3,4-tetrazolyl, thienyl, pyrazolyl, pyrazinyl, pyridazinyl, pyrimidinyl, pyrrolyl, 1,3,4-oxadiazolyl, 1,2,4-oxadiazolyl, furazanyl, imidazolyl, furanyl, oxazolyl, isoxazolyl, thiazolyl, isothiazolyl, pyranyl.

In the present invention, when ring

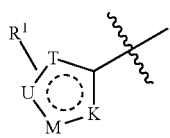

wherein

G and L are each independently selected from one of NH, $NR^2$, O, or S;

$R^1$, $R^2$ and $R^3$ are each independently selected from hydrogen, hydroxyl, phenyl, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —NR$^5$R$^6$, or —C(O)NR$^6$; wherein optionally, the 5-10 membered heteroaryl is substituted with one or more substituents selected from halogen, hydroxyl, cyano, nitro, $C_{1-8}$alkyl, $C_{2-8}$alkenyl, $C_{2-8}$alkynyl, $C_{3-8}$cycloalkyl, 3-8 membered heterocyclyl, $C_{5-10}$aryl, 5-10 membered heteroaryl, $C_{1-6}$alkoxy, $C_{3-8}$cycloalkoxy, —S(O)p$R^4$, —C(O)$R^4$, —C(O)O$R^4$, —NR$^5$R$^6$, or —C(O)NR$^6$; wherein $R^4$, $R^5$, and $R^6$ are each independently hydrogen or $C_{1-4}$alkyl, p is 0, 1, or 2.

The triaromatic compound targeting bifunctional phosphorylation site of STAT3 of the present invention includes any one of the compounds listed below, or the pharmaceutically acceptable salts, metabolites or prodrugs thereof:

1-methyl-(6-((5-(3-phenyl-1,2,4-oxadiazol-5-yl)pyrazin-2-yl)oxy)-1H-indol-2-yl)(4-(4-(2,2,2-trifluoroethoxy)benzyl)piperazin-1-yl)methanone (6-((5-(3-(4-fluorophenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(2-fluorophenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(3-fluorophenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(4-methoxyphenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(4-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(2-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(3-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(2-methoxyphenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(3-methoxyphenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(4-chlorophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (6-((5-(3-(4-bromophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (6-((5-(3-(4-(trifluoromethoxyphenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (6-((5-(3-(4-(trifluoromethyl)phenyl)-1,2,4-oxadiazol-5-yl)pyrazin-2-yl)oxy)-1H-indol-2-yl) (4-(4-(2,2,2-trifluoroethoxy)benzyl)piperazin-1-yl)methanone (1-ethyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxybenzyl)piperazin-1-yl)methanone (1-propyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxy)benzyl)piperazin-1-yl)methanone (1-allyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxy)benzyl)piperazin-1-yl)methanone (1-(2-methoxyethyl)-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoroethoxy)benzyl)piperazin-1-yl)methanone 2-methyl-1-(2-(4-(4-(2,2,2-trifluoroethoxy)benzyl)piperazin-1-carbonyl-6-((5-(3-(4-(trifluoromethyl)phenyl)-1,2,4-oxadiazol-5-yl)pyrazin-2-yl)oxy)-1H-indol-1-yl)propan-1-one Methyl 2-(2-(4-(4-(2,2,2-trifluoromethoxy)benzyl)piperazin-1-carbonyl-6-((5-(3-(4-trifluoromethyl)phenyl-1,2,4-oxadiazol-5-yl)pyridin-2-yl)oxy-1H-indol-1-yl)acetate Ethyl 2-(2-(4-(4-(2,2,2-trifluoromethoxy)benzyl)piperazin-1-carbonyl-6-((5-(3-(4-trifluoromethyl)phenyl-1,2,4-oxadiazol-5-yl)pyridin-2-yl)oxy-1H-indol-1-yl)acetate (1-benzyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxy)benzyl)piperazin-1-yl)methanone (4-benzylpiperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(3-methylbenzyl)piperazin-1-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(4-methylbenzyl)piperazin-1-yl)methanone (4-(4-fluorobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (4-(4-chlorobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (4-(4-bromobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(3-(trifluoromethyl)benzyl)piperazin-1-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(4-(trifluoromethyl)benzyl)piperazin-1-yl)methanone (4-(4-methoxybenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(3-(2,2,2-trifluoroethoxy)benzyl)piperazin-1-yl)methanone (1-methyl-6-((5-(3-(4-(trifluoromethyl)phenyl)-1,2,4-oxadiazol-5-yl)pyrazin-2-yl)oxy)-1H-indol-2-yl)(4-(2-(2,2,2-trifluoroethoxy)benzyl)piperazin-1-yl)methanone (1-methyl-6-((5-(3-(4-(trifluoromethyl)phenyl)-1,2,4-oxadiazol-5-yl)pyrazin-2-yl)oxy)-1H-indol-2-yl)(4-methylpiperazin-1-yl)methanone (4-ethylpiperazin-1-yl)(1-methyl-6-((5-(3-(4-(trifluoromethyl)phenyl)-1,2,4-oxadiazol-5-yl) pyrazin-2-yl)oxy)-1H-indol-2-yl)methanone (1-methyl-6-((5-(3-(4-(trifluoromethyl)phenyl)-1,2,4-oxadiazol-5-yl)pyrazin-2-yl)oxy-1H-indol-2-yl)(4-propylpiperazin-1-yl)methanone Methyl 2-(4-(1-methyl-6-((5-(3-(4-(trifluoromethyl)phenyl)-1,2,4-oxadiazol-5-yl)pyrazin-2-yl)oxy)-1H-indol-2-carbonyl)piperazin-1-yl)acetate 2-chloro-1-(4-(1-methyl-6-((5-(3-(4-(trifluoromethyl)phenyl)-1,2,4-oxadiazol-5-yl)pyrazin-2-yl)oxy)-1H-indol-2-carbonyl)piperazin-1-yl)ethanone (1-methyl-6-((5-(3-(4-(trifluoromethyl)phenyl)-1,2,4-oxadiazol-5-yl)pyrazin-2-yl)oxy-1H-indol-2-yl)(4-(4-(trifluoromethyl)benzoyl)piperazin-1-yl)methanone.

Terms, as used in the present invention, $C_{1-6}$ is selected from $C_1$, $C_2$, $C_3$, $C_4$, $C_5$ and $C_6$; $C_{1-8}$ is selected from $C_1$, $C_2$, $C_3$, $C_4$, $C_5$, $C_6$, $C_7$ and $C_8$; $C_{2-8}$ is selected from $C_2$, $C_3$, $C_4$, $C_5$, $C_6$, $C_7$ and $C_8$; $C_{3-8}$ is selected from $C_3$, $C_4$, $C_5$, $C_6$, $C_7$ and $C_8$; $C_{5-10}$ is selected from $C_5$, $C_6$, $C_7$, $C_8$, $C_9$ and $C_{10}$. As used herein, the term "pharmaceutically acceptable" refers to those compounds, materials, compositions and/or dosage forms, which within the scope of sound medical judgment, are suitable for use in contact with human and animal tissues, have no excessive toxicity, irritation, allergic reactions or other problems or complications, and are commensurate to reasonable benefit/risk ratio.

Wherein the term "pharmaceutically acceptable salt" refers to salts of the compound of the present invention, which is prepared from the compound containing a specific substituent discovered by the present invention and a relatively non-toxic acid or base. When compounds of the present invention contain relatively acidic functional groups, base addition salts can be obtained by contacting the neutral form of such compounds with a sufficient amount of base, either in a pure solution or a suitable inert solvent. Pharmacologically acceptable base addition salts include sodium, potassium, calcium, amine, organic amine or magnesium salts or similar salts. When compounds of the present invention contain relatively basic functional groups, acid addition salts can be obtained by contacting the neutral form of such compounds with a sufficient amount of acid, either in a pure solution or a suitable inert solvent. Examples of pharmaceutically acceptable acid addition salts include inorganic acid salts, for example, the inorganic acid includes hydrochloric acid, hydrobromic acid, nitric acid, carbonic acid, bicarbonate, phosphoric acid, monohydrogen phosphate, dihydrogen phosphate, sulfate, disulfate, hydriodic acid, phosphite, etc.; and organic acid salts, the organic acid includes, for example, acetic acid, propionic acid, isobutyric acid, maleic acid, malonic acid, benzoic acid, succinic acid, octanedioic acid, trans-butenedioic acid, lactic acid, mandelic acid, phthalic acid, benzenesulfonic acid, p-toluenesulfonic acid, citric acid, tartaric acid, and methanesulfonic acid, and the like; further include salts of amino acids (such as arginine, etc.), and salts of organic acids such as glucuronic acid. Some specific compounds of the present invention contain both acidic and basic functional groups and can thus be converted to any base or acid addition salts.

Preferably, the neutral form of the compounds can be regenerated by contacting base or acid in a conventional manner and then separating the parent compound. The parent form of the compound differs from each salt forms thereof in certain physical properties, such as different solubility in polar solvents.

As used in the present invention, "pharmaceutically acceptable salt" belongs to derivatives of compounds of the present invention, wherein the parent compound is modified to form a salt with an acid or with a base. Examples of pharmaceutically acceptable salts include inorganic or organic salts of basic groups (such as amines), salts formed from acid radical (such as alkali metal salt of carboxylic acid) or organic acids, etc. Examples of pharmaceutically acceptable salts include conventional non-toxic salts or quaternary salts of the parent compounds, such as salts formed with non-toxic inorganic or organic acids. Conventional non-toxic ones include those salts derived from inorganic and organic acids, which are selected from 2-acetoxybenzoic acid, 2-hydroxyethanesulfonic acid, acetic acid, ascorbic acid, benzenesulfonic acid, benzoic acid, bicarbonate, carbonic acid, citric acid, edetate, ethanedisulfonic acid, ethanesulfonic acid, fumaric acid, glucoheptose, gluconic acid, glutamic acid, ethanoic acid, hydrobromic acid, hydrochloric acid, hydriodate, hydroxyl, hydroxynaphthalene, hydroxyethanesulfonic acid, lactic acid, lactose, dodecyl sulfonic acid, maleic acid, malic acid, mandelic acid, methane sulfonic acid, nitric acid, oxalic acid, dihydroxynaphthoic acid, pantothenic acid, phenylacetic acid, phosphoric acid, polygalacturonic acid, propionic acid, salicylic acid, stearic acid, folinate, succinic acid, sulfamic acid, p-aminobenzenesulfonic acid, sulfuric acid, tannin, tartaric acid and p-toluenesulfonic acid.

The pharmaceutically acceptable salts of the present invention can be synthesized by conventional chemical methods from a parent compound containing an acid radical or a basic group. In general, the preparation method of such salts is that the salts are prepared by reacting free acid or base forms of these compounds with stoichiometric amounts of the appropriate base or acid in water or organic solvent or a mixture thereof. Generally, non-aqueous media such as ether, ethyl acetate, ethanol, isopropanol or acetonitrile are preferred.

In addition to the salt form, the compounds provided by the present invention also present in the form of a prodrugs. The prodrugs of the compounds described in the present invention are susceptible to chemical changes under physiological conditions thereby converted to the compounds of the present invention. Any compounds that are able to convert in vivo to provide biologically active substances (including compounds of formulae (I) to (V)) are prodrugs within the scope and purport of the present invention. For example, a compound containing a carboxyl group may form a physiologically hydrolysable ester which acts as a prodrugs and can be hydrolysis in vivo to give the compound of formulas (I) to (V) itself. the prodrugs are preferably administered orally because in many cases hydrolysis occurs mainly under the effect of digestive enzymes. Parenteral administration may be used when the ester itself has a activity or when hydrolysis occurs in the blood. In addition, the prodrugs may be chemically or biochemically transformed to the compounds of the present invention in the in vivo environment.

Some compounds of the present invention may have asymmetric carbon atoms (optical centers) or double bonds. Racemates, diastereoisomers, geometric isomers and individual isomers are included within the protecting scope of the present invention.

The compounds of the present invention can have specific geometric isomerism or stereoisomeric forms. All such compounds, including cis and trans isomers, (−)- and (+)-enantiomers, diastereoisomers, (D)-isomers, (L)-isomers, and racemic mixtures thereof and other mixtures, such as mixtures enriched with enantiomers or diastereoisomers, are within the protecting scope of the present invention. Additional asymmetric carbon atoms may be present in substituents such as alkyl groups. All these isomers, as well as their mixtures, are included in the protecting scope of the present invention.

The compounds of the present disclosure may also contain atomic isotope in an unnatural proportion at one or more of the atoms that constitute such compounds. For example, compounds can be labeled with isotopes such as deuterium ($^2H$), tritium ($^3H$), iodine-125 ($^{125}I$), or C-14 ($^{14}C$). All transformations of the isotopic composition of the compounds of the present invention, whether radioactive or not, are included in the scope of the present invention.

Wherein the term "excipient" generally refers to the carrier, diluent and/or medium required to configure an effective pharmaceutical composition.

For a drug or pharmacologically active agent, the term "effective amount" or "therapeutically effective amount" refers to a sufficient amount of a drug or agent that is non-toxic but capable of achieving the desired effect. For the oral dosage forms of the present invention, the "effective amount" of an active substance in a composition is the amount required to achieve the desired effect when another active substance in the composition is used in combination. The determination of the effective amount varies from person to person, depending on the age and general condition of the recipient, as well as on the specific active substance, and the appropriate effective amount in each case can be determined by those skilled in the art according to common experiments.

Wherein the terms "active ingredient", "therapeutic agent", "active substance" or "active agent" refer to a chemical entity that is effective in treating targeted disorder, disease or condition.

Wherein the term "substituted" refers to any one or more hydrogen atoms on a particular atom substituted by a substituent, including deuterium and hydrogen variants, provided that the valence state of the particular atom is normal and the substituted compound is stable. When the substituent is a ketone group (i. e., when C=O), it means that two hydrogen atoms are substituted. The ketone substitution does not occur directly on the aromatic group. The term "optionally substituted" means that it may or may not be substituted, and unless otherwise specified, the type and number of substituents may be arbitrary on the basis of chemically achievable.

When any variate (e. g., R) appears more than once in the composition or structure of a compound, the definition thereof in each case is independent. Thus, for example, if a group is substituted by 0-2 R, said group can be optionally substituted by up to two R, and R in each case is an independent option. Furthermore, combinations of substituents and/or variants thereof are only allowed if such combinations would yield stable compounds. When one of the variants is selected from a single bond, it means that the two groups to which it is attached are connected directly, for example, when L in A-L-Z represents a single bond it means that the structure is actually A-Z.

In the context of the present invention, all involved terms "alkyl" or "alkane" or "alkyl group" are used interchangeably herein, wherein said alkyl group may optionally substituted with one or more substituents as described in the present invention. In some embodiments, the alkyl group contains 1-8 carbon atoms; in other embodiments, the alkyl group contains 1-6 carbon atoms; in other embodiments, the alkyl group contains 1-4 carbon atoms. Examples of alkyl groups include, but are not limited to, methyl (Me, —$CH_3$), ethyl (Et, —$CH_2CH_3$), n-propyl (n-Pr, —$CH_2CH_2CH_3$), isopropyl (i-Pr, —$CH(CH_3)_2$), n-butyl (n-Bu, —$CH_2CH_2CH_2CH_3$), isobutyl (i-Bu, —$CH_2CH(CH_3)_2$), sec-butyl (s-Bu, —$CH(CH_3)CH_2CH_3$), tert-butyl (t-Bu, —$C(CH_3)_3$), n-pentyl (—$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_3CH(CH_3)CH_2CH_3$), n-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2,3-dimethyl-2-butyl (—$C(CH_3)_2CH(CH_3)_2$), 3-3-dimethyl-2-butyl (—$CH(CH_3)C(CH_3)_3$), n-heptyl, n-octyl and the like.

Wherein, the term "alkoxy" indicates that the alkyl group is attached to the rest of the molecule by an oxygen atom, wherein the alkyl group has the meaning as described in the present invention. Unless otherwise specified, alkoxy group contains 1 to 6 carbon atoms. Examples of alkoxy groups include, but are not limited to, methoxy (MeO, —$OCH_3$), ethoxy (EtO, —$OCH_2CH_3$), propoxy (n-PrO, —$OCH_2CH_2CH_3$), isopropoxy (i-PrO, —$OCH(CH_3)_2$), n-butoxy (n-BuO, —$OCH_2CH_2CH_2CH_3$), iso-butoxy (i-BuO, —$OCH_2CH(CH_3)_2$), sec-butoxy (s-BuO, —$OCH(CH_3)CH_2CH_3$), tert-butoxy (t-BuO, —$OC(CH_3)_3$), n-pentyloxy (—$OCH_2CH_2CH_2CH_2CH_3$), 2-pentyloxy (—$OCH(CH_3)CH_2CH_2CH_3$), 3-pentyloxy (—$OCH(CH_2CH_3)_2$), 2-methyl-2-butoxy (—$OC(CH_3)_2CH_2CH_3$), 3-methyl-2-butoxy (—$OCH(CH_3)CH(CH_3)_2$), 3-methyl-1-butoxy (—$OCH_2CH_2CH(CH_3)_2$), 2-methyl-1-butoxy (—$OCH_3CH(CH_3)CH_2CH_3$), n-hexyloxy (—$OCH_2CH_2CH_2CH_2CH_2CH_3$), and the like.

Wherein the term "cycloalkyl" indicates a saturated monocyclic, bicyclic or tricyclic system containing 3-8 carbon atoms, being monovalent or polyvalent, wherein said cycloalkyl group may optionally be substituted with one or more substituents as described herein. In some embodiments, the cycloalkyl group contains 3 to 8 carbon atoms. Such examples include, but are not limited to: cyclopropyl, cyclobutyl, cyclopentyl, cyclohexyl, cycloheptyl, cyclooctyl, etc.

Wherein, the term "halogen" refers to fluorine (F), chlorine (Cl), bromine (Br), or iodine (I).

The term "comprises" is an open-ended expression, i. e., means including what is specified in the present invention, but not excluding other aspects.

According to an embodiment of the present invention, the compounds of formulas (I) to (V) provided herein are prepared by the following synthetic route (scheme (1)), wherein T, U, M, K, G, L, $R^1$, $R^2$ and $R^3$ are defined as in the above compounds of formula (I) to (V) of the present invention.

General synthetic method for preparing compounds of formulae (I) to (V) via scheme (1)

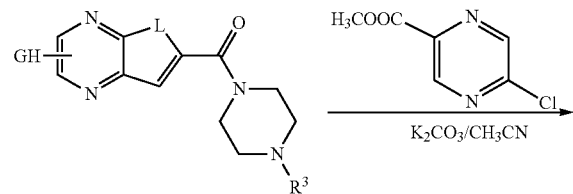

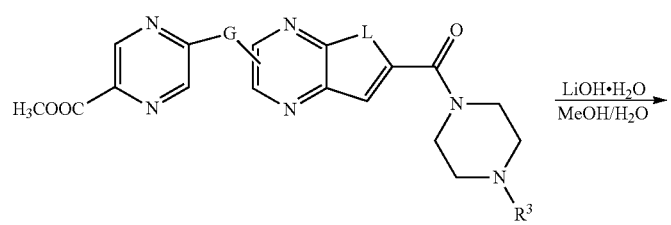

-continued

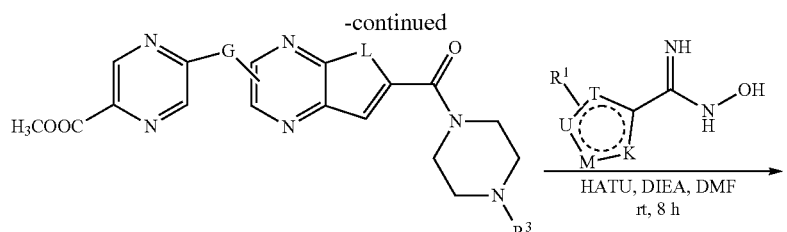

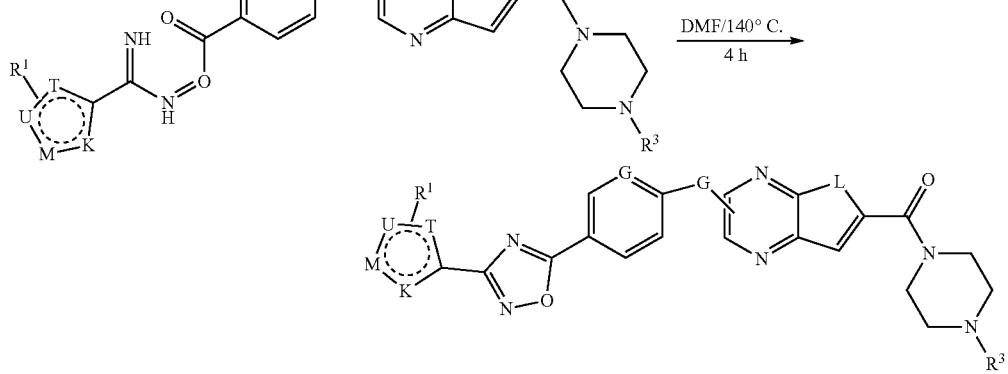

The compounds of formula (I) to (V) can be prepared quickly and efficiently by using the synthesis method of the present invention, and the synthesis method has a short synthetic route and eco-friendly, a high yield and purity of the target products can be obtained, raw materials are easily available, simple in operation and post-treatment, and suitable for industrial production.

The reaction solvents used in each reaction steps described in the present invention have no special limitation, and any solvents that can dissolve the starting materials to some extent and does not inhibit the reaction are included in the present invention. In addition, many similar modifications, equivalent substitutions, or solvents, combinations of solvents, and different ratios of combinations of solvents equivalent to those described in the present invention are considered to be included in the scope of the present invention.

The present invention further proposes a pharmaceutical composition, the pharmaceutical composition comprising a therapeutic dose of the compounds of the preceding formulae (I) to (V) and pharmaceutically acceptable salts, metabolites or precursors thereof, and a pharmaceutically acceptable carrier.

Wherein, the term "pharmaceutical composition" indicates a mixture containing one or more of the compounds described herein or a physiologically/pharmaceutically acceptable salts or prodrugs thereof and other chemical components, or other components such as physiological saline/pharmaceutically acceptable carriers and excipients. The pharmaceutical compositions are intended to facilitate the administration to the organism and to facilitate the absorption of the active ingredient and thus exert its biological activity.

The present invention also provides a method for preventing and/or treating diseases associated with the activation of STAT3 bifunctional phosphorylation site by administering an effective amount of the compound of formula (I) to (V) or pharmaceutical composition to an individual in need thereof.

In the present invention, the "individual in need" includes a patient with a tumor, an individual with a potential tumor, a normal individual, etc.

wherein the diseases include, but are not limited to, malignancies, examples thereof include pediatric brain tumors such as astroglioma, malignant medulloblastoma, germ cell tumour, craniopharyngioma, ependymoma and the like; adult brain tumor such as glioma, meningioma, pituitary adenoma, schwannoma and the like; head-neck carcinoma such as maxillary sinus carcinoma, pharyngolaryngeal cancer (nasopharynx cancer, middle pharyngeal carcinoma, hypopharyngeal carcinoma), laryngocarcinoma, oral cancer, cheilocarcinoma, tongue cancer, parotid carcinoma, and the like; breast cancer or tumors such as small cell lung cancer, non-small cell lung cancer, thymoma, mesothelioma, and the like; digestive tract cancer and tumors such as esophagus cancer, liver cancer, primary hepatic carcinoma, gallbladder carcinoma, cancer of biliary duct, gastric carcinoma, colorectal cancer, colon cancer, rectal cancer, anal cancer, pancreatic cancer, pancreatic endocrine tumor, and the like; urinary organs cancer or tumors such as carcinoma of penis, pelvic ureteral carcinoma, renal cell carcinoma, testiculoma, prostate cancer, bladder cancer, nephroblastoma, urothelial cancer, and the like; gynecological cancers or tumors such as carcinoma of vulva, cervical cancer, corpus carcinoma, endometrial cancer, sarcoma of uterus, choriocarcinoma, vaginal cancer, breast cancer, ovarian cancer, ovarian germ cell tumor, and the like; adult and pediatric soft tissue sarcoma; bone tumour such as osteosarcoma, ewing's tumor, and the like; endocrine tissue cancer or tumors such as adrenocortical carcinoma, thyroid cancer, and the like; malignant lymphoma or leukemia such as malignant lymphoma, non-hodgkin's lymphoma, hodgkin's disease, multiple myeloma, plasmacytoid tumors, acute myelogenous leukemia, acute lymphocytic leukemia, adult T cell leukemia lymphoma, chronic myelocytic leukimia, hronic lymphatic leukemia, and the like; skin cancer or tumors such as chronic myeloproliferative disease, malignant melanoma, squamous-cell carcinoma, basal cell carcinoma, granuloma fungoides, and the like; and metastatic lesions of the above mentioned tumors or cancers, and the like.

According to embodiments of the present invention, the pharmaceutical composition further comprises a second agent which differs from the compound mentioned above and is used for the preventing and/or treating cancer, renal fibrosis, pulmonary fibrosis, rheumatoid arthritis, psoriasis, lupus erythematosus, inflammatory lung disease, and inflammatory bowel disease, and the like.

According to embodiments of the present invention, the combination of the second agent and the compounds of formulae (I)-(V) makes said pharmaceutical composition more effective for inhibition of STAT3 bifunctional phosphorylation sites and can be used for the prevention and/or treatment of prevention of cancer, renal fibrosis, pulmonary fibrosis, rheumatoid arthritis, psoriasis, lupus erythematosus, inflammatory lung disease and inflammatory bowel disease, and the like.

According to an embodiment of the present invention, the pharmaceutical composition further comprises excipients, diluents, adjuvants, vehicles or combinations thereof.

According to an embodiment of the present invention, the pharmaceutical compositions are in the form of tablets, capsules, injections, powder injections, powders, syrups, solutions, suspensions, or aerosols. The suitability of the pharmaceutical composition can thus be significantly improved. And the pharmaceutical compositions according to above embodiments of the present invention can be stocked in a suitable solid or liquid carriers or diluents and in suitable disinfection containers for injection or drip infusion.

Various dosage forms of the pharmaceutical compositions of the invention can be prepared according to the conventional preparation methods in the pharmaceutical field. The compounds and pharmaceutical compositions of the invention can be used clinically in mammals, including humans and animals, and can be administered by mouth, nose, skin, lung, or gastrointestinal tract. Regardless of any administration mode, the optimal dosage for an individual should be determined depends on the specific treatment regimen. Normally, start with a small dose and gradually increase the dose until the most suitable dose is found. The most preferred route of administration is oral or dermal administration.

The present invention further provides a STAT3 inhibitor comprising a triaromatic compound targeting STAT3 bifunctional phosphorylation site as described above, or the pharmaceutically acceptable salts, metabolites or prodrugs thereof.

The present invention further provides a use of above-mentioned compounds, compounds obtained by above-mentioned methods, or above-mentioned pharmaceutical compositions in the preparation of STAT3 inhibitors; wherein said compounds or compositions are used for inhibiting STAT3 phosphorylation, inhibiting STAT3 transcriptional activity and oxidative phosphorylation of mitochondria.

In the present invention, the compound or combination inhibits expression of STAT3-Tyr705 and Ser727 in pancreatic cancer cells, inhibits bifunctional phosphorylation of $STAT3^{Y705/S727}$ in various cell lines of hepatocellular carcinoma, inhibits phosphorylation of bifunctional phosphorylation site of $STAT3^{Y705/S727}$ in hepatoma carcinoma cells, inhibits phosphorylation of bifunctional phosphorylation site of $STAT3^{Y705/S727}$ in gastric carcinoma cells, and inhibits phosphorylation of bifunctional phosphorylation site of $STAT3^{Y705/S727}$ in colon cancer cells.

The present invention provides a use of above-mentioned compounds, compounds obtained by above-mentioned methods, or above-mentioned pharmaceutical compositions in preparation of drugs for the preventing and/or treating diseases caused or modulated by activation of bifunctional phosphorylation site of STAT3.

According to specific embodiments of the present invention, the drug is used for at least one of the following: for treating diseases associated with activation of bifunctional phosphorylation site of STAT3, including, but not limited to, malignancies, examples thereof include pediatric brain tumors such as astroglioma, malignant medulloblastoma, germ cell tumour, craniopharyngioma, ependymoma and the like; adult brain tumor such as glioma, meningioma, pituitary adenoma, schwannoma and the like; head-neck carcinoma such as maxillary sinus carcinoma, pharyngolaryngeal cancer (nasopharynx cancer, middle pharyngeal carcinoma, hypopharyngeal carcinoma), laryngocarcinoma, oral cance, cheilocarcinoma, tongue cancer, parotid carcinoma, and the like; breast cancer or tumors such as small cell lung cancer, non-small cell lung cancer, thymoma, mesothelioma, and the like; digestive tract cancer and tumors such as esophagus cancer, liver cancer, primary hepatic carcinoma, gallbladder carcinoma, cancer of biliary duct, gastric carcinoma, colorectal cancer, colon cancer, rectal cancer, anal cancer, pancreatic cancer, pancreatic endocrine tumor, and the like; urinary organs cancer and tumors such as carcinoma of penis, pelvic ureteral carcinoma, renal cell carcinoma, testiculoma, prostate cancer, bladder cancer, nephroblastoma, urothelial cancer, and the like; gynecological cancers or tumors such as carcinoma of vulva, cervical cancer, corpus carcinoma, endometrial cancer, sarcoma of uterus, choriocarcinoma, vaginal cancer, breast cancer, ovarian cancer, ovarian germ cell tumor, and the like; adult and pediatric soft tissue sarcoma; bone tumour such as osteosarcoma, ewing's tumor, and the like; endocrine tissue cancer or tumors such as adrenocortical carcinoma, thyroid cancer, and the like; malignant lymphomaor leukemia such as malignant lymphoma, non-hodgkin's lymphoma, hodgkin's disease, multiple myeloma, plasmacytoid tumors, acute myelogenous leukemia, acute lymphocytic leukemia, adult T cell leukemia lymphoma, chronic myelocytic leukimia, hronic lymphatic leukemia, and the like; skin cancer or tumors such as chronic myeloproliferative disease, malignant melanoma, squamous-cell carcinoma, basal cell carcinoma, granuloma fungoides, and the like; metastatic lesions of the above mentioned tumors or cancers, and the like, renal fibrosis, pulmonary fibrosis, rheumatoid arthritis, psoriasis, lupus erythematosus, inflammatory lung disease and inflammatory bowel disease, and the like.

According to the present invention, the compounds of formulae (I)-(V) or pharmaceutical composition described herein have a significant binding effect on STAT3.

According to the present invention, the compounds of formulae (I)-(V) or pharmaceutical composition described herein can significantly inhibit the proliferation, growth, infiltration, clone formation and metastasis of a variety of cancer cells, and significantly promote the apoptosis of a variety of cancer cells, thus can prolong the survival period of tumor patients.

According to the present invention, the compounds of formulae (I)-(V) or pharmaceutical composition described herein show good metabolic stability, which provides an important basis for further clinical studies.

According to the present invention, the compounds of formulae (I)-(V) or pharmaceutical composition described herein can significantly inhibit the proliferation, growth, infiltration, clone formation and metastasis of tumors in vivo, and are significantly safer than the positive control IACS-010759.

Therefore, the drug of the present invention can be effectively used as a STAT3 inhibitor, inhibiting the phosphorylation and function of the bi-site of STAT3, and can prevent and/or treat diseases associated with the activation of the STAT3 bifunctional phosphorylation site. The diseases associated with activation of STAT3 bifunctional phosphorylation site, including, but not limited to, malignancies, examples thereof include pediatric brain tumors such as astroglioma, malignant medulloblastoma, germ cell tumour, craniopharyngioma, ependymoma and the like; adult brain tumor such as glioma, meningioma, pituitary adenoma, schwannoma and the like; head-neck carcinoma such as maxillary sinus carcinoma, pharyngolaryngeal cancer (nasopharynx cancer, middle pharyngeal carcinoma, hypopharyngeal carcinoma), laryngocarcinoma, oral cance, cheilocarcinoma, tongue cancer, parotid carcinoma, and the like; breast cancer or tumors such as small cell lung cancer, non-small cell lung cancer, thymoma, mesothelioma, and the like; digestive tract cancer or tumors such as esophagus cancer, liver cancer, primary hepatic carcinoma, gallbladder carcinoma, cancer of biliary duct, gastric carcinoma, colorectal cancer, colon cancer, rectal cancer, anal cancer, pancreatic Cancer, pancreatic endocrine tumor, and the like; urinary organs cancer or tumors such as carcinoma of penis, pelvic ureteral carcinoma, renal cell carcinoma, testiculoma, prostate cancer, bladder cancer, nephroblastoma, urothelial cancer, and the like; gynecological cancers and tumors such as carcinoma of vulva, cervical cancer, corpus carcinoma, endometrial cancer, sarcoma of uterus, choriocarcinoma, vaginal cancer, breast cancer, ovarian cancer, ovarian germ cell tumor, and the like; adult and pediatric soft tissue sarcoma; bone tumour such as osteosarcoma, ewing's tumor, and the like; endocrine tissue cancer or tumors such as adrenocortical carcinoma, thyroid cancer, and the like; malignant lymphoma or leukemia such as malignant lymphoma, non-hodgkin's lymphoma, hodgkin's disease, multiple myeloma, plasmacytoid tumors, acute myelogenous leukemia, acute lymphocytic leukemia, adult T cell leukemia lymphoma, chronic myelocytic leukimia, hronic lymphatic leukemia, and the like; skin cancer or tumors such as chronic myeloproliferative disease, malignant melanoma, squamous-cell carcinoma, basal cell carcinoma, granuloma fungoides, and the like; metastatic lesions of the above mentioned tumors and cancers, and the like. preferably, the disease is selected from pancreatic cancer Capan-2, PANC-1, MIAPACA-2, BXPC3, SW1990, CFPAC-1, Pan02, ASPC-1; gastric cancer MKN45, BGC823, MGC803, liver cancer Huh7, PLC/PRF-5, HepG2, SK-hep1, SMMC7721, HCCC9810; lung cancer HCC827, A549, H460, H23, H1299, H522, H1975, PC-9; prostate cancer DU145, LNCAP; colon cancer HCT8, HT29, HCT-116.

According to embodiments of the present invention, the pharmaceutical composition further comprises a second agent which differs from the compound mentioned above and is used for the treating or preventing cancer, renal fibrosis, pulmonary fibrosis, rheumatoid arthritis, psoriasis, lupus erythematosus, inflammatory lung disease, and inflammatory bowel disease, and the like.

The present invention further provides a method for preventing and/or treating diseases associated with the activation of STAT3 bifunctional phosphorylation site, comprising administering an effective amount of above-mentioned compounds or pharmaceutical composition to a tumor patient.

The present invention designs a class of triaromatic compound having novel structure that inhibit both STAT3 transcriptional activity and mitochondrial oxidative phosphorylation mainly by targeting STAT3 bifunctional phosphorylation sites. In vivo/ex vivo experiments show that the compounds of the present invention have the potent antitumor activity. Compared with the clinical phase I oxidative phosphorylation inhibitor IACS-010759, on the one hand, the compounds of the present invention significantly prolong the survival of mice in tumor model mice, which is superior to the positive compound IACS-010759; on the other hand, compared with IACS-010759, the compounds of the present invention have no significant toxic side effects and have a better safety profile than IACS-010759.

The beneficial effects of the present invention include the triaromatic compounds targeting STAT3 bifunctional phosphorylation site or pharmaceutical compositions provided by the present invention can be used as STAT3 inhibitors for the prevention and/or treatment of diseases caused or modulated by the activation of STAT3 bifunctional phosphorylation site, and have good clinical applications and pharmaceutical uses.

EMBODIMENTS FOR CARRYING OUT THE INVENTION

Figure 1:
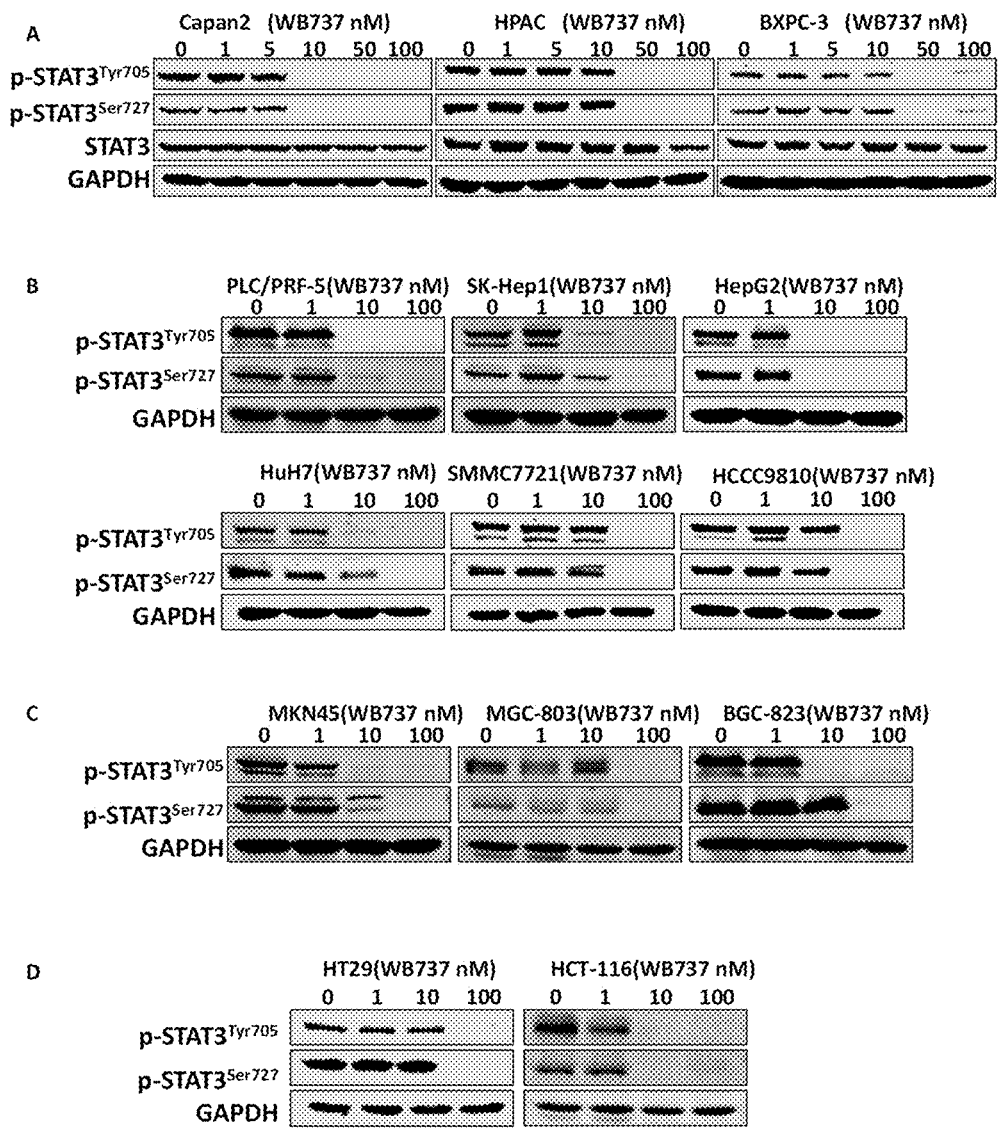
FIG. 1 shows the inhibitory effect of representative compound example 6 (No. WB737) on $STAT3^{Y705/S727}$ bifunctional phosphorylation in various types of tumor cells detected by WB. Wherein (A) represents the inhibitory effect of WB737 on $STAT3^{Y705/S727}$ bifunctional phosphorylation in each pancreatic cancer cells; (B) represents the inhibitory effect of WB737 on $STAT3^{Y705/S727}$ bifunctional phosphorylation in each liver cancer cells; (C) represents the inhibitory effect of WB737 on $STAT3^{Y705/S727}$ bifunctional phosphorylation in each gastric cancer cells; (D) represents the inhibitory effect of WB737 on $STAT3^{Y705/S727}$ bifunctional phosphorylation in each colon cancer cells.

Target products 1a-1l are as shown in scheme 2: 6-hydroxyindole-2-carboxylic acid and 1-Boc-piperazine were coupled, then reacted with methyl 5-chloropyrazine-2-carboxylate to obtain intermediate methyl 5-((2-(4-(tert-butoxycarbonyl)piperazine-1-carbonyl)-1H-indol-6-yl)oxy)pyrazine-2-carboxylate; then methylation was conducted on the indole of the intermediate methyl 5-((2-(4-(tert-butoxycarbonyl)piperazine-1-carbonyl)-1H-indol-6-yl)oxy)pyrazine-2-carboxylate, the Boc protecting group on the piperazine was removed, after the reaction with 4-(2,2,2-trifluoroethoxy)benzyl bromide, hydrolysis were conducted to obtain intermediate 5-((1-methyl-2-(4-(4-(2,2,2-trifluoroethoxy)benzyl)piperazine-1-carbonyl)-1H-indol-6-yl)oxy)pyrazine-2-carboxylic acid; the intermediate 5-((1-methyl-2-(4-(4-(2,2,2-trifluoroethoxy)benzyl)piperazine-1-carbonyl)-1H-indol-6-yl)oxy)pyrazine-2-carboxylic acid was coupled with a substituted oxime, then a cyclization reaction were conducted at 140° C. to obtain target products 1a-1l.

Scheme 1. Synthetic procedure of 1a-1l

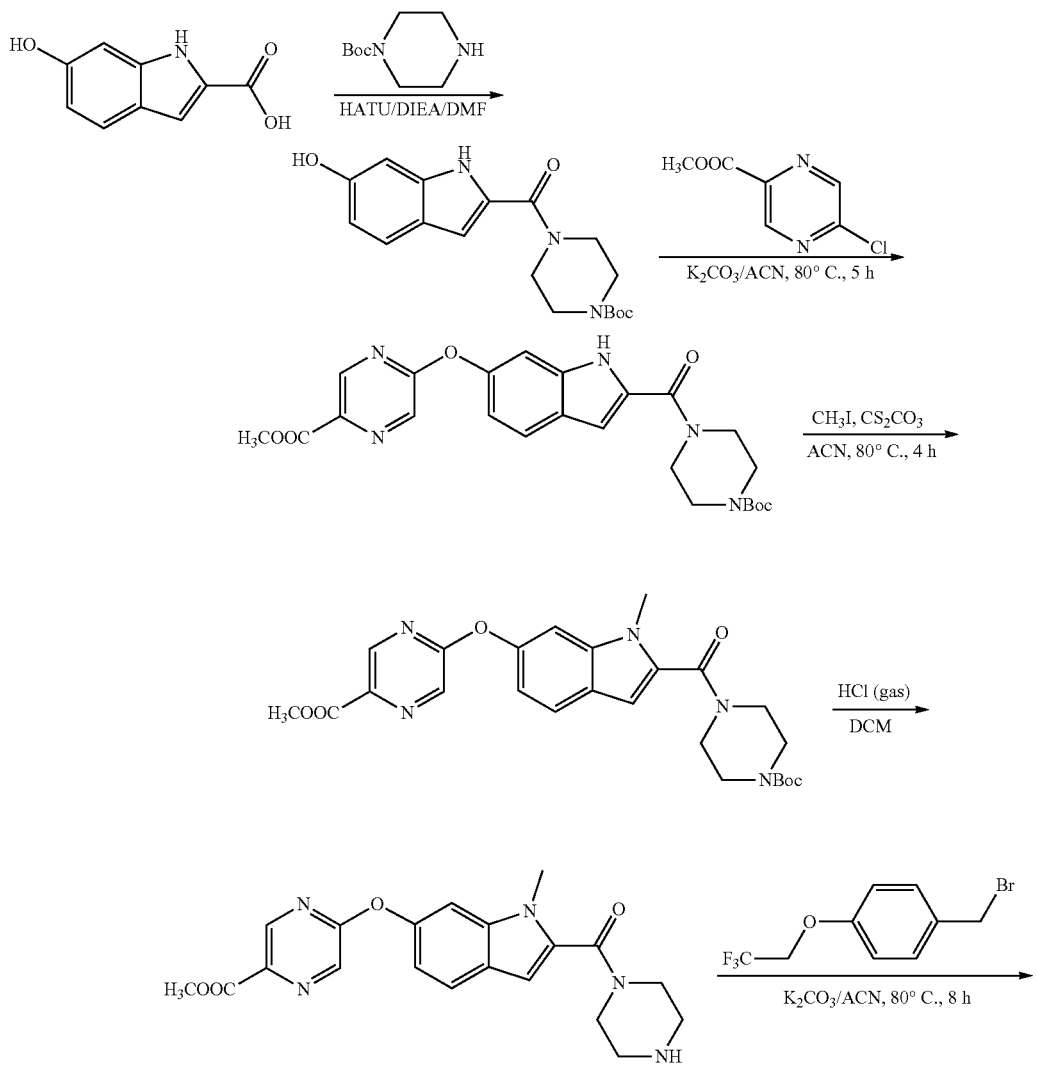

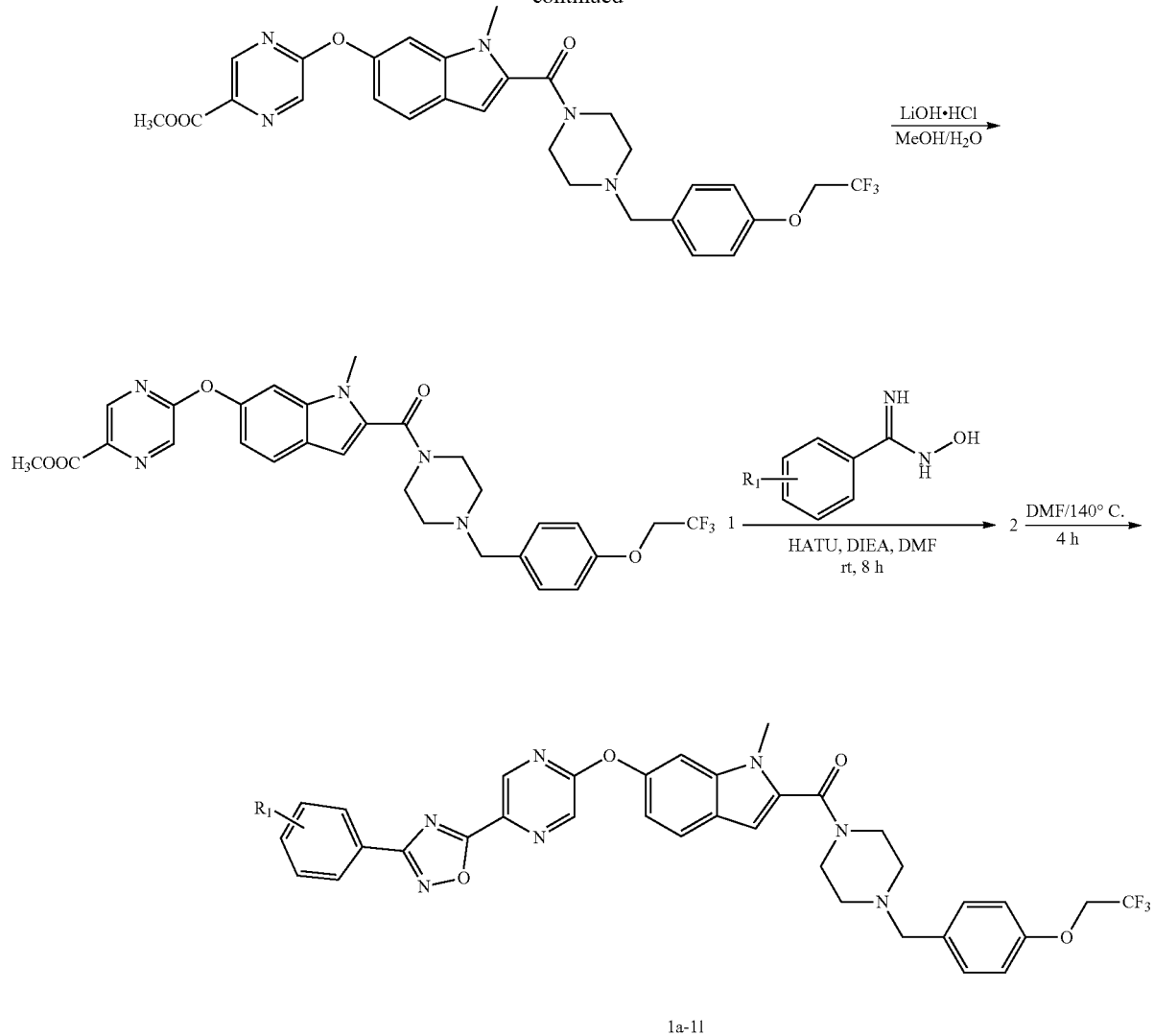
Synthetic procedure of target products 2a-2i are as shown in scheme 3: product 2a was obtained using the method shown in scheme 2; then 2a was used as an intermediate and reacted with different brominated alkanes or brominated arenes to give intermediates 2b-2i.
Scheme 3. Synthetic procedure of 2a-2i
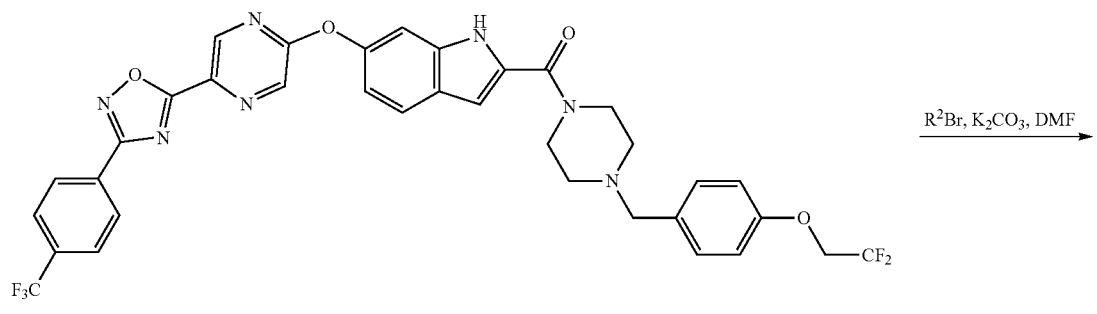

-continued

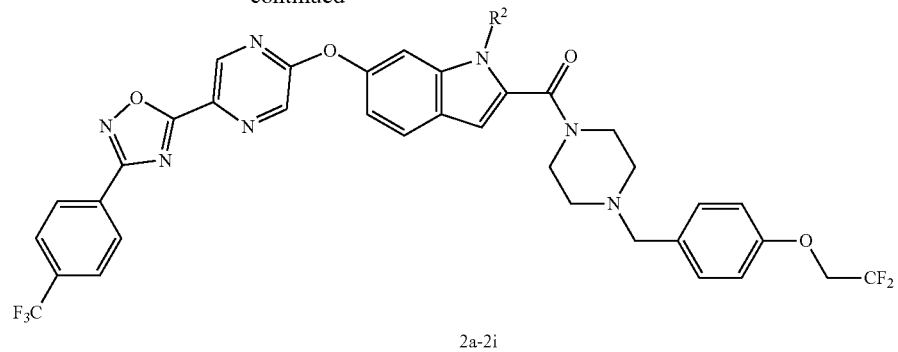

2a-2i

Synthetic procedure of target products 3a-3q is as shown in scheme 4: intermediate 3 was obtained using the method shown in scheme 2. the Boc protecting group of the intermediate 3 was removed, and dissolved in DMF with commercially available benzyl bromides or bromoalkyls etc. and potassium carbonate and stirred for 2 h at room temperature to give the target products 3a-3q.

detected by TLC, 50 ml of distilled water was added and the precipitated solid was filtered, dried for standby; the dried solid was dissolved in DMF and heated to 140 degrees for 4 hours to obtain the target product 1-methyl-(6-((5-(3-phenyl-1,2,4-oxadiazol-5-yl)pyrazin-2-yl)oxy)-1H-indol-2-yl)(4-(4-(2,2,2-trifluoroethoxy)benzyl)piperazin-1-yl)methanone (1a, 167 mg, 50%). 1H NMR (500 MHz, CDCl$_3$)

Scheme 4. Synthetic procedure of 3a-3q

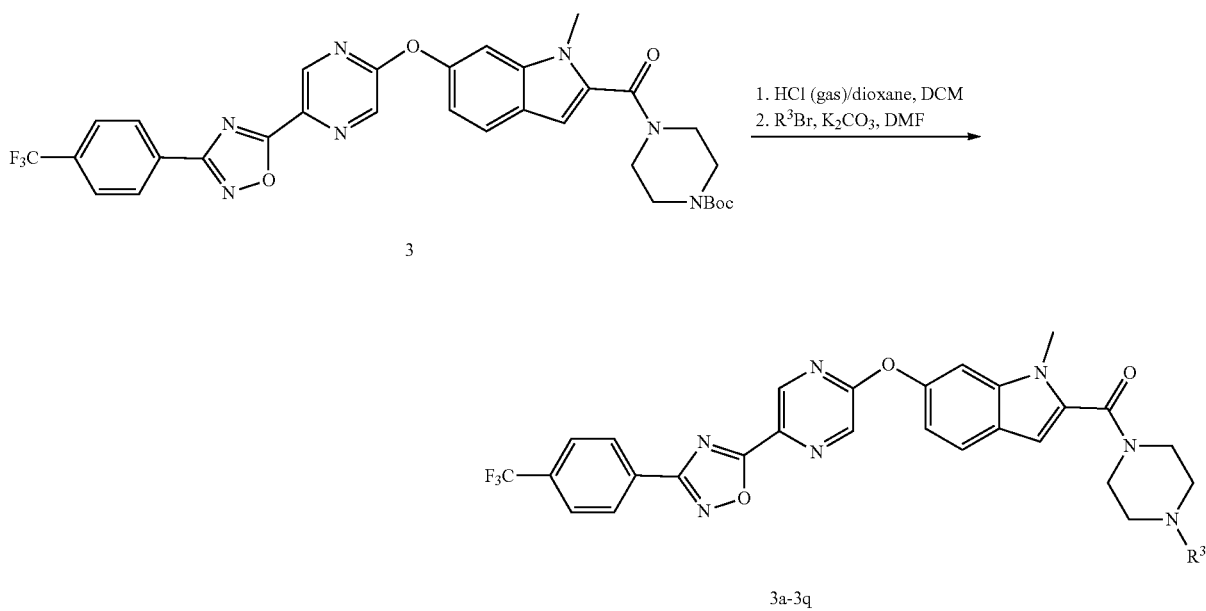

3a-3q

Example 1. Synthesis of 1-methyl-(6-((5-(3-phenyl-1,2,4-oxadiazol-5-yl)pyrazin-2-yl)oxy)-1H-indol-2-yl)(4-(4-(2,2,2-trifluoroethoxy)benzyl)piperazin-1-yl)methanone (1a)

Intermediate 5-((1-methyl-2-(4-(4-(2,2,2-trifluoroethoxy)benzyl)piperazin-1-carbonyl)-1H-indol-6-yl)oxy)pyrazin-2-carboxylic acid (284 mg, 0.5 mmol), benzamide oxime (136 mg, 1.0 mmol) and HATU (380 mg, 1.0 mmol) were weighed and dissolved in 5 ml DMF, DIEA (0.17 ml, 1.0 mmol) was added dropwise and then the reaction was stirred at room temperature for 8 h. After the completion of reaction δ 9.01 (d, J=1.3 Hz, 1H), 8.64 (d, J=1.3 Hz, 1H), 8.21 (d, J=1.4 Hz, 1H), 8.20 (d, J=1.9 Hz, 1H), 7.68 (d, J=8.5 Hz, 1H), 7.54-7.49 (m, 3H), 7.30 (d, J=8.4 Hz, 2H), 7.22 (d, J=1.9 Hz, 1H), 6.98 (dd, J=8.5, 2.1 Hz, 1H), 6.92 (d, J=8.6 Hz, 2H), 6.63 (d, J=0.5 Hz, 1H), 4.35 (q, J=8.1 Hz, 2H), 3.88-3.75 (m, 7H), 3.53-3.52 (m, 2H), 2.51-2.50 (m, 4H). $^{13}$C NMR (125 MHz, CDCl$_3$) δ172.68, 169.30, 162.64, 162.15, 156.87, 149.07, 142.76, 138.20, 136.33, 133.51, 132.94, 131.61, 130.67, 129.01, 127.78, 126.45, 124.73, 124.54, 122.88, 122.33, 114.94, 114.66, 103.99, 102.73, 66.13, 65.85, 62.14, 31.51, 31.07.

Example 2. Synthesis of (6-((5-(3-(4-fluorophenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1b)

According to the synthesis method of Example 1, benzamide oxime (136 mg, 1.0 mmol) was replaced with 4-fluorobenzamide oxime (154 mg, 1.0 mmol) to obtain the target product (6-((5-(3-(4-fluorophenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1b, 297 mg, 87%). $^1$H NMR (500 MHz, CDCl$_3$) δ 9.00 (d, J=1.2 Hz, 1H), 8.64 (d, J=1.2 Hz, 1H), 8.20 (dd, J=8.8, 5.4 Hz, 2H), 7.68 (d, J=8.6 Hz, 1H), 7.30 (d, J=8.1 Hz, 2H), 7.22-7.18 (m, 3H), 6.97 (dd, J=8.5, 2.0 Hz, 1H), 6.92 (d, J=8.6 Hz, 2H), 6.62 (s, 1H), 4.35 (q, J=8.1 Hz, 2H), 3.88-3.75 (m, 7H), 3.54-3.53 (m, 2H), 2.51-2.50 (m, 4H). $^{13}$C NMR (125 MHz, CDCl$_3$) δ172.79, 168.51, 165.88, 163.87, 162.66, 162.20, 149.07, 142.79, 138.22, 136.39, 133.41, 130.71, 130.03, 129.96, 124.77, 122.90, 122.73, 122.71, 116.34, 116.17, 114.98, 114.66, 104.01, 102.73, 66.17, 65.89, 62.15, 36.62, 31.52.

Example 3. Synthesis of (6-((5-(3-(2-fluorophenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1c)

According to the synthesis method of Example 1, benzamide oxime (136 mg, 1.0 mmol) was replaced with 2-fluorobenzamide oxime (154 mg, 1.0 mmol) to obtain the target product (6-((5-(3-(2-fluorophenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1c, 212 mg, 62%). $^1$H NMR (500 MHz, CDCl$_3$) δ9.02 (d, J=1.3 Hz, 1H), 8.65 (d, J=1.3 Hz, 1H), 8.21 (td, J=7.6, 1.7 Hz, 1H), 7.68 (d, J=8.6 Hz, 1H), 7.55-7.51 (m, 1H), 7.33-7.29 (m, 3H), 7.25 (d, J=6.5 Hz, 1H), 7.22 (d, J=1.9 Hz, 1H), 6.98 (dd, J=8.5, 2.1 Hz, 1H), 6.92 (d, J=8.5 Hz, 2H), 6.63 (s, 1H), 4.35 (q, J=8.1 Hz, 2H), 3.88-3.75 (m, 7H), 3.53-3.52 (m, 2H), 2.51-2.50 (m, 4H). $^{13}$C NMR (125 MHz, CDCl$_3$) δ172.34, 166.21, 166.17, 162.67, 162.22, 149.09, 142.88, 138.24, 136.40, 133.38, 133.24, 133.17, 131.13, 130.69, 124.76, 124.63, 124.60, 122.91, 116.96, 116.79, 114.99, 114.89, 114.79, 114.68, 104.02, 102.74, 66.18, 65.89, 62.15, 31.53, 31.09.

Example 4. Synthesis of (6-((5-(3-(3-fluorophenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1d)

According to the synthesis method of Example 1, benzamide oxime (136 mg, 1.0 mmol) was replaced with 3-fluorobenzamide oxime (154 mg, 1.0 mmol) to obtain the target product (6-((5-(3-(3-fluorophenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1d, 78 mg, 23%). $^1$H NMR (500 MHz, CDCl$_3$) δ9.00 (d, J=1.1 Hz, 1H), 8.64 (d, J=1.1 Hz, 1H), 8.00 (d, J=7.8 Hz, 1H), 7.91 (dd, J=9.1, 1.9 Hz, 1H), 7.68 (d, J=8.6 Hz, 1H), 7.51-7.47 (m, 1H), 7.31 (d, J=6.6 Hz, 2H), 7.26-7.22 (m, 2H), 6.98 (dd, J=8.5, 2.0 Hz, 1H), 6.92 (d, J=8.5 Hz, 2H), 6.63 (s, 1H), 4.35 (q, J=8.1 Hz, 2H), 3.88-3.75 (m, 7H), 3.56-3.55 (m, 2H), 2.53-2.52 (m, 4H). $^{13}$C NMR (125 MHz, CDCl$_3$) δ172.95, 168.49, 163.99, 162.66, 162.23, 149.08, 142.84, 138.24, 136.42, 133.35, 130.81, 130.74, 128.54, 128.47, 124.76, 124.54, 123.53, 122.92, 122.33, 118.72, 118.55, 115.01, 114.76, 114.68, 104.06, 102.74, 66.16, 65.88, 62.09, 31.53, 31.08.

Example 5. Synthesis of (6-((5-(3-(4-methoxyphenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1e)

According to the synthesis method of Example 1, benzamide oxime (136 mg, 1.0 mmol) was replaced with 4-methoxybenzamide oxime (166 mg, 1.0 mmol) to obtain the target product (6-((5-(3-(4-methoxyphenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1e, 250 mg, 72%). $^1$H NMR (500 MHz, CDCl$_3$) δ 8.99 (s, 1H), 8.63 (s, 1H), 8.14 (d, J=8.7 Hz, 2H), 7.67 (d, J=8.6 Hz, 1H), 7.30 (d, J=8.0 Hz, 2H), 7.22 (s, 1H), 7.01 (d, J=8.8 Hz, 2H), 6.97 (dd, J=8.5, 1.8 Hz, 1H), 6.92 (d, J=8.4 Hz, 2H), 6.62 (s, 1H), 4.35 (q, J=8.1 Hz, 2H), 3.88 (s, 3H), 3.85-3.75 (m, 7H), 3.54-3.53 (m, 2H), 2.51-2.50 (m, 4H). $^{13}$C NMR (125 MHz, CDCl$_3$) δ 172.41, 169.01, 162.67, 162.27, 162.10, 156.90, 149.11, 142.70, 138.22, 136.29, 133.62, 132.96, 130.68, 129.44, 124.73, 124.55, 122.88, 122.34, 118.90, 114.97, 114.68, 114.40, 104.00, 102.73, 66.16, 65.88, 62.14, 55.53, 31.51, 31.07.

Example 6. Synthesis of (6-((5-(3-(4-(trifluoromethyl)phenyl)-1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1f or WB737)

According to the synthesis method of Example 1, benzamide oxime (136 mg, 1.0 mmol) was replaced with 4-(trifluoromethyl)benzamide oxime (204 mg, 1.0 mmol) to obtain the target product (6-((5-(3-(4-(trifluoromethyl)phenyl)1,2,4-oxadiazol-5-yl)pyrazin-2-yl)oxy)1-methyl-1H-indol-2-yl)(4-(4-(2,2,2-trifluoroethoxy)benzyl)piperazin-1-yl)methanone (1f or WB737, 214 mg, 58%). $^1$H NMR (500 MHz, CDCl$_3$) δ 9.02 (s, 1H), 8.65 (s, 1H), 8.34 (d, J=8.1 Hz, 2H), 7.78 (d, J=8.2 Hz, 2H), 7.68 (d, J=8.6 Hz, 1H), 7.30 (d, J=7.5 Hz, 2H), 7.22 (s, 1H), 6.98 (dd, J=8.5, 1.8 Hz, 1H), 6.92 (d, J=8.4 Hz, 2H), 6.63 (s, 1H), 4.35 (q, J=8.1 Hz, 2H), 3.85-3.75 (m, 7H), 3.53-3.52 (m, 2H), 2.51-2.50 (m, 4H). $^{13}$C NMR (125 MHz, CDCl$_3$) δ 173.21, 168.36, 162.67, 162.31, 156.91, 149.07, 142.92, 138.25, 136.49, 133.28, 130.65, 129.92, 128.19, 126.07, 126.04, 124.95, 124.82, 124.57, 122.92, 122.79, 122.36, 115.02, 114.64, 104.00, 102.73, 66.22, 65.94, 62.19, 31.52, 31.06.

Example 7. Synthesis of (6-((5-(3-(2-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1g)

According to the synthesis method of Example 1, benzamide oxime (136 mg, 1.0 mmol) was replaced with 2-(trifluoromethyl)benzamide oxime (204 mg, 1.0 mmol) to obtain the target product (6-((5-(3-(2-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1g, 177 mg, 48%). $^1$H NMR (500 MHz, CDCl$_3$) δ 9.01 (d, J=1.3 Hz, 1H), 8.64 (d, J=1.3 Hz, 1H), 7.90-7.86 (m, 2H), 7.71-7.66 (m, 3H), 7.29 (d, J=7.8 Hz, 2H), 7.21 (d, J=1.7 Hz, 1H), 6.97 (dd, J=8.5, 2.0 Hz, 1H), 6.92 (d, J=8.6 Hz, 2H), 6.62 (s, 1H), 4.35 (q, J=8.1 Hz, 2H), 3.88-3.75 (m, 7H), 3.53-3.52 (m, 2H), 2.51-2.50 (m, 4H).

$^{13}$C NMR (125 MHz, CDCl$_3$) δ 172.65, 168.42, 162.66, 162.27, 149.07, 142.96, 138.21, 136.37, 133.33, 132.07, 132.02, 131.09, 130.67, 129.76, 129.50, 127.10, 127.06, 125.31, 124.77, 124.59, 122.90, 122.41, 122.34, 114.97, 114.65, 103.99, 102.73, 66.17, 65.89, 62.16, 31.51, 31.07.

Example 8. Synthesis of (6-((5-(3-(3-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1h)

According to the synthesis method of Example 1, benzamide oxime (136 mg, 1.0 mmol) was replaced with 3-(trifluoromethyl)benzamide oxime (204 mg, 1.0 mmol) to obtain the target product (6-((5-(3-(3-(trifluoromethyl)phenyl)-1,2,4-oxadiazol-5-yl)pyrazin-2-yl)oxy)-1-methyl-1H-indol-2-yl)(4-(4-(2,2,2-trifluoroethoxy)benzyl)piperazin-1-yl)methanone (1h, 177 mg, 48%). $^1$H NMR (500 MHz, CDCl$_3$) δ 9.02 (d, J=1.2 Hz, 1H), 8.66 (d, J=1.2 Hz, 1H), 8.49 (s, 1H), 8.40 (d, J=7.8 Hz, 1H), 7.80 (d, J=7.8 Hz, 1H), 7.69-7.64 (m, 2H), 7.31 (s, 2H), 7.22 (d, J=1.8 Hz, 1H), 6.98 (dd, J=8.5, 2.0 Hz, 1H), 6.92 (d, J=8.5 Hz, 2H), 6.63 (s, 1H), 4.35 (q, J=8.1 Hz, 2H), 3.85-3.75 (m, 7H), 3.54-3.53 (m, 2H), 2.52-2.51 (m, 4H). $^{13}$C NMR (125 MHz, CDCl$_3$) δ 173.17, 168.34, 162.66, 162.28, 156.92, 149.05, 142.91, 138.23, 136.50, 133.23, 131.81, 131.55, 130.91, 129.65, 128.22, 127.41, 124.91, 124.83, 124.80, 124.55, 122.92, 122.75, 122.34, 115.00, 114.65, 104.02, 102.73, 66.17, 65.89, 62.14, 36.62, 31.53.

Example 9. Synthesis of (6-((5-(3-(2-methoxyphenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1i)

According to the synthesis method of Example 1, benzamide oxime (136 mg, 1.0 mmol) was replaced with 2-methoxybenzamide oxime (166 mg, 1.0 mmol) to obtain the target product (6-((5-(3-(2-methoxyphenylfluorophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1i, 60 mg, 17%). $^1$H NMR (500 MHz, CDCl$_3$) δ 9.03 (d, J=1.3 Hz, 1H), 8.66 (d, J=1.3 Hz, 1H), 8.18 (dd, J=7.7, 1.7 Hz, 1H), 7.69 (d, J=8.5 Hz, 1H), 7.53 (ddd, J=8.5, 7.5, 1.8 Hz, 1H), 7.31 (d, J=8.4 Hz, 2H), 7.24 (d, J=1.9 Hz, 1H), 7.14-7.09 (m, 2H), 6.99 (dd, J=8.5, 2.1 Hz, 1H), 6.94 (d, J=8.6 Hz, 2H), 6.64 (s, 1H), 4.36 (q, J=8.1 Hz, 2H), 4.02 (s, 3H), 3.87-3.81 (m, 7H), 3.56-3.55 (m, 2H), 2.53-2.50 (m, 4H). $^{13}$C NMR (125 MHz, CDCl$_3$) δ 171.53, 171.30, 167.75, 162.65, 162.06, 158.30, 156.87, 149.10, 142.73, 138.20, 136.25, 133.63, 132.75, 131.71, 130.68, 124.69, 124.53, 122.85, 122.32, 120.78, 115.43, 114.93, 114.68, 111.74, 103.99, 102.72, 66.12, 65.84, 60.52, 56.11, 31.49, 29.81.

Example 10. Synthesis of (6-((5-(3-(3-methoxyphenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1j)

According to the synthesis method of Example 1, benzamide oxime (136 mg, 1.0 mmol) was replaced with 3-methoxybenzamide oxime (166 mg, 1.0 mmol) to obtain the target product (6-((5-(3-(3-methoxyphenylfluorophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1j, 160 mg, 46%). $^1$H NMR (500 MHz, CDCl$_3$) δ 9.01 (d, J=1.3 Hz, 1H), 8.64 (d, J=1.3 Hz, 1H), 7.80 (d, J=7.7 Hz, 1H), 7.71 (dd, J=2.4, 1.5 Hz, 1H), 7.67 (d, J=8.5 Hz, 1H), 7.41 (dd, J=8.0, 8.0 Hz, 1H), 7.30 (d, J=8.0 Hz, 2H), 7.22 (d, J=1.9 Hz, 1H), 7.08 (dd, J=8.6, 2.9 Hz, 1H), 6.97 (dd, J=8.5, 2.1 Hz, 1H), 6.92 (d, J=8.6 Hz, 2H), 6.62 (s, 1H), 4.35 (q, J=8.1 Hz, 2H), 3.89 (s, 3H), 3.81-3.75 (m, 7H), 3.53-3.52 (m, 2H), 2.51-2.50 (m, 4H). $^{13}$C NMR (125 MHz, CDCl$_3$) δ 172.67, 169.27, 162.65, 162.15, 160.02, 149.07, 142.79, 138.20, 136.33, 133.49, 130.69, 130.14, 127.63, 124.73, 124.54, 122.88, 122.32, 120.26, 118.16, 117.28, 114.95, 114.66, 112.23, 111.79, 104.00, 102.72, 66.13, 65.85, 62.14, 55.65, 31.51, 31.08.

Example 11. Synthesis of (6-((5-(3-(4-chlorophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1k)

According to the synthesis method of Example 1, benzamide oxime (136 mg, 1.0 mmol) was replaced with 4-chlorobenzamide oxime (170 mg, 1.0 mmol) to obtain the target product (6-((5-(3-(4-chlorophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1k, 158 mg, 45%). $^1$H NMR (500 MHz, CDCl$_3$) δ 8.99 (d, J=1.3 Hz, 1H), 8.64 (d, J=1.3 Hz, 1H), 8.14 (d, J=8.6 Hz, 2H), 7.68 (d, J=8.6 Hz, 1H), 7.49 (d, J=8.6 Hz, 2H), 7.29 (d, J=8.3 Hz, 2H), 7.22 (d, J=1.9 Hz, 1H), 6.97 (dd, J=8.5, 2.1 Hz, 1H), 6.92 (d, J=8.6 Hz, 2H), 6.63 (s, 1H), 4.35 (q, J=8.1 Hz, 2H), 3.87-3.75 (m, 7H), 3.53-3.52 (m, 2H), 2.51-2.50 (m, 4H). $^{13}$C NMR (125 MHz, CDCl$_3$) δ 172.87, 168.52, 162.63, 162.21, 156.87, 149.02, 142.81, 138.20, 137.79, 136.41, 133.33, 132.97, 130.66, 129.36, 129.09, 124.96, 124.76, 124.54, 122.89, 122.33, 114.95, 114.64, 104.00, 102.73, 66.14, 65.86, 62.16, 31.52, 29.82.

Example 12. Synthesis of (6-((5-(3-(4-bromophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1l)

According to the synthesis method of Example 1, benzamide oxime (136 mg, 1.0 mmol) was replaced with 4-bromobenzamide oxime (215 mg, 1.0 mmol) to obtain the target product (6-((5-(3-(4-bromophenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1l, 121 mg, 32%). $^1$H NMR (500 MHz, CDCl$_3$) δ 8.99 (d, J=1.3 Hz, 1H), 8.64 (d, J=1.3 Hz, 1H), 8.07 (d, J=8.6 Hz, 2H), 7.68 (d, J=8.6 Hz, 1H), 7.65 (d, J=8.6 Hz, 2H), 7.30 (d, J=7.8 Hz, 2H), 7.22 (d, J=1.9 Hz, 1H), 6.98 (d, J=2.1 Hz, 1H), 6.92 (d, J=8.6 Hz, 2H), 6.63 (s, 1H), 4.35 (q, J=8.1 Hz, 2H), 3.85-3.75 (m, 7H), 3.54-3.53 (m, 2H), 2.51-2.50 (m, 4H). $^{13}$C NMR (125 MHz, CDCl$_3$) δ 172.90, 168.62, 162.64, 162.21, 149.03, 142.81, 138.21, 136.42, 133.31, 132.33, 130.68, 129.28, 126.25, 125.41, 124.76, 124.54, 122.90, 122.33, 115.21, 115.08, 114.96, 114.65, 104.02, 102.73, 66.14, 65.86, 62.14, 36.63, 31.52.

Example 13. Synthesis of (6-((5-(3-(4-(trifluoromethoxy)phenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1m)

According to the synthesis method of Example 1, benzamide oxime (136 mg, 1.0 mmol) was replaced with 4-(trifluoromethoxy)benzamide oxime (220 mg, 1.0 mmol) to obtain the target product (6-((5-(3-(4-(trifluoromethoxy)phenyl)-1,2,4-oxadiazol-5-yl)pyrazin-2-yl)oxy)-1-methyl-1H-indol-2-yl) (4-(4-(2,2,2-trifluoroethoxy)benzyl)piperazin-1-yl)methanone (1m, 212 mg, 56%). $^1$H NMR (500 MHz, CDCl$_3$) δ 9.00 (d, J=1.3 Hz, 1H), 8.65 (d, J=1.3 Hz, 1H), 8.25 (d, J=8.8 Hz, 2H), 7.68 (d, J=8.6 Hz, 1H), 7.35 (d, J=8.2 Hz, 2H), 7.29 (d, J=8.2 Hz, 2H), 7.22 (d, J=1.9 Hz, 1H), 6.97 (dd, J=8.5, 2.1 Hz, 1H), 6.92 (d, J=8.6 Hz, 2H), 6.63 (s, 1H), 4.35 (q, J=8.1 Hz, 2H), 3.85-3.75 (m, 7H), 3.53-3.52 (m, 2H), 2.51-2.50 (m, 4H). $^{13}$C NMR (125 MHz, CDCl$_3$) δ 172.96, 168.29, 162.64, 162.24, 156.88, 151.60, 149.02, 142.84, 138.20, 136.43, 133.30, 132.98, 130.67, 129.56, 125.05, 124.77, 124.54, 122.90, 121.49, 121.22, 119.44, 114.95, 114.63, 104.00, 102.73, 66.15, 65.86, 62.15, 36.62, 31.52.

Example 14. Synthesis of (6-((5-(3-(4-(trifluoromethyl)phenyl)-1,2,4-oxadiazol-5-yl)pyrazin-2-yl)oxy)-1H-indol-2-yl) (4-(4-(2,2,2-trifluoroethoxy)benzyl)piperazin-1-yl)methanone (2a)

Using the method shown in scheme 2 without methylation on indole to obtain the final product (6-((5-(3-(4-(trifluoromethyl)phenyl)1,2,4-oxadiazol-5-yl)pyrazin-2-yl)oxy)-1H-indol-2-yl) (4-(4-(2,2,2-trifluoroethoxy)benzyl)piperazin-1-yl)methanone (2a), as white solid, yield 60%. $^1$H NMR (500 MHz, DMSO-d$_6$) δ 11.77 (d, J=1.4 Hz, 1H), 9.05 (s, 1H), 8.79 (s, 1H), 8.32 (d, J=8.2 Hz, 2H), 7.99 (d, J=8.4 Hz, 2H), 7.69 (d, J=8.6 Hz, 1H), 7.29 (d, J=8.6 Hz, 3H), 7.03 (d, J=8.7 Hz, 2H), 6.99 (dd, J=8.6, 2.1 Hz, 1H), 6.85 (d, J=1.4 Hz, 1H), 4.75 (q, J=8.9 Hz, 2H), 3.89-3.64 (m, 4H), 3.49 (s, 2H), 2.46-2.39 (m, 4H).

Example 15. Synthesis of (1-ethyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxy)benzyl)piperazin-1-yl)methanone (2b)

(6-((5-(3-(4-(trifluoromethyl)phenyl)-1,2,4-oxadiazol-5-yl)pyrazin-2-yl)oxy)-1H-indol-2-yl) (4-(4-(2,2,2-trifluoroethoxy)benzyl)piperazin-1-yl)methanone (2a), bromoethane (32 mg, 0.3 mmol), and Cs$_2$CO$_3$ (54 mg, 0.4 mmol) were weighed and dissolved in 3 ml DMF, and stirred for 2 h at ordinary room temperature. After the reaction was completed monitored by TLC, to the reaction solution added an appropriate amount of water and extracted with an appropriate amount of ethyl acetate for three times. Organic phases were combined and washed with saturated saline, then dried with anhydrous Na$_2$SO$_4$ and purified by column chromatography to obtain (1-ethyl-6-((5-(3-(4-(trifluoromethyl)phenyl)-1,2,4-oxadiazol-5-yl)pyrazin-2-yl)oxy)-1H-indol-2-yl) (4-(4-(2,2,2-trifluoromethoxybenzyl)piperazin-1-yl)methanone (2b) 90 mg, yield 60%. H NMR (500 MHz, DMSO-d$_6$) δ 9.08 (d, J=0.8 Hz, 1H), 8.82 (d, J=0.8 Hz, 1H), 8.33 (d, J=8.1 Hz, 2H), 8.00 (d, J=8.2 Hz, 2H), 7.71 (d, J=8.6 Hz, 1H), 7.55 (s, 1H), 7.28 (d, J=8.4 Hz, 2H), 7.08-7.00 (m, 3H), 6.75 (s, 1H), 4.91-4.86 (m, 2H), 4.75 (q, J=8.8 Hz, 2H), 3.73-3.60 (m, 4H), 3.47 (s, 2H), 2.43-2.34 (m, 4H), 1.26-1.19 (m, 3H).

Example 16. Synthesis of (1-propyl-6-((5-(3-(4-(trifluoromethyl)phenyl)-1,2,4-oxadiazol-5-yl)pyrazin-2-yl)oxy)-1H-indol-2-yl)(4-(4-(2,2,2-trifluoromethoxy)benzyl)piperazin-1-yl)methanone (2c)

The product 2c was obtained using the same synthetic method as 2b by replacing bromoethane with 1-bromopropane, yield 54%. $^1$H NMR (500 MHz, DMSO-d$_6$) δ 9.09 (s, 1H), 8.82 (s, 1H), 8.34 (d, J=8.1 Hz, 2H), 8.01 (d, J=8.2 Hz, 2H), 7.69 (d, J=8.5 Hz, 1H), 7.60 (s, 1H), 7.29 (d, J=8.4 Hz, 2H), 7.06-6.96 (m, 3H), 6.71 (s, 1H), 4.75 (q, J=8.8 Hz, 2H), 4.20 (t, J=6.7 Hz, 2H), 3.72-3.62 (m, 4H), 3.48 (s, 2H), 2.43-2.36 (m, 4H), 1.69-1.61 (m, 2H), 0.77 (t, J=7.3 Hz, 3H).

Example 17. Synthesis of (1-allyl-6-((5-(3-(4-(trifluoromethyl)phenyl)-1,2,4-oxadiazol-5-yl)pyrazin-2-yl)oxy)-1H-indol-2-yl) (4-(4-(2,2,2-trifluoromethoxy)benzyl)piperazin-1-yl)methanone (2d)

The product 2d was obtained using the same synthetic method as 2b by replacing bromoethane with 3-bromopropylene, yield 51%.
$^1$H NMR (500 MHz, DMSO-d$_6$) δ 9.08 (d, J=1.3 Hz, 1H), 8.81 (d, J=1.3 Hz, 1H), 8.33 (d, J=8.1 Hz, 2H), 8.00 (d, J=8.3 Hz, 2H), 7.70 (d, J=8.6 Hz, 1H), 7.53 (d, J=1.9 Hz, 1H), 7.28 (d, J=8.6 Hz, 2H), 7.04 (dd, J=8.6, 2.1 Hz, 1H), 7.02 (d, J=8.7 Hz, 2H), 6.74 (s, 1H), 5.94-5.86 (m, 1H), 5.08 (d, J=10.3 Hz, 1H), 4.90-4.87 (m, 3H), 4.74 (q, J=8.9 Hz, 2H), 3.68-3.62 (m, 4H), 3.47 (s, 2H), 2.41-2.36 (m, 4H).

Example 18. Synthesis of (1-(2-methoxyethyl)-6-((5-(3-(4-(trifluoromethyl)phenyl)-1,2,4-oxadiazol-5-yl)pyrazin-2-yl)oxy)-1H-indol-2-yl) (4-(4-(2,2,2-trifluoroethoxy)benzyl)piperazin-1-yl)methanone (2e)

The product 2e was obtained using the same synthetic method as 2b by replacing bromoethane with 2-bromoethyl methyl ether, yield 45%. $^1$H NMR (500 MHz, DMSO-d$_6$) δ 9.09 (d, J=1.3 Hz, 1H), 8.83 (d, J=1.3 Hz, 1H), 8.33 (d, J=8.1 Hz, 2H), 8.01 (d, J=8.4 Hz, 2H), 7.69 (d, J=8.6 Hz, 1H), 7.59 (d, J=1.8 Hz, 1H), 7.29 (d, J=8.6 Hz, 2H), 7.04 (dd, J=8.0, 2.6 Hz, 2H), 7.02 (s, 1H), 6.70 (s, 1H), 4.75 (q, J=8.9 Hz, 2H), 4.45 (t, J=5.0 Hz, 2H), 3.72-3.59 (m, 4H), 3.54-3.46 (m, 4H), 3.13 (s, 3H), 2.46-2.39 (m, 4H).

Example 19. Synthesis of 2-methyl-1-(2-(4-(4-(2,2,2-trifluoroethoxy)benzyl)piperazin-1-carbonyl-6-((5-(3-(4-(trifluoromethyl)phenyl)-1,2,4-oxadiazol-5-yl)pyrazin-2-yl)oxy)-1H-indol-1-yl)propan-1-one (2f)

The product 2f was obtained using the same synthetic method as 2b by replacing bromoethane with isobutyryl chloride, yield 50%. $^1$H NMR (500 MHz, DMSO-d$_6$) δ 9.06 (d, J=1.3 Hz, 1H), 8.85 (d, J=1.3 Hz, 1H), 8.33 (d, J=8.1 Hz, 2H), 8.00 (d, J=8.3 Hz, 2H), 7.94 (d, J=2.0 Hz, 1H), 7.78 (d, J=8.5 Hz, 1H), 7.30 (s, 1H), 7.28 (dd, J=8.4, 2.1 Hz, 2H), 7.03-7.02 (m, 3H), 4.74 (q, J=8.9 Hz, 2H), 3.72-3.62 (m, 4H), 3.50 (s, 2H), 3.22-3.15 (m, 1H), 2.46-2.37 (m, 4H), 1.14 (d, J=6.7 Hz, 6H).

Example 20. Synthesis of Methyl 2-(2-(4-(4-(2,2,2-trifluoromethoxy)benzyl)piperazin-1-carbonyl-6-((5-(3-(4-(trifluoromethyl)phenyl-1,2,4-oxadiazol-5-yl)pyridin-2-yl)oxy-1H-indol-1-yl)acetate (2g)

The product 2g was obtained using the same synthetic method as 2b by replacing bromoethane with 2-bromomethyl acetate, yield 56%. $^1$H NMR (500 MHz, DMSO-d$_6$) δ 9.08 (d, J=1.3 Hz, 1H), 8.83 (d, J=1.3 Hz, 1H), 8.33 (d, J=8.1 Hz, 2H), 8.00 (d, J=8.4 Hz, 2H), 7.72 (d, J=8.6 Hz, 1H), 7.62 (d, J=1.7 Hz, 1H), 7.28 (d, J=8.5 Hz, 2H), 7.07 (dd, J=8.5, 2.0 Hz, 1H), 7.02 (d, J=8.6 Hz, 2H), 6.83 (s, 1H), 5.14 (s, 2H), 4.74 (q, J=8.9 Hz, 2H), 3.77-3.64 (m, 4H), 3.62 (s, 3H), 3.48 (s, 2H), 2.43-2.35 (m, 4H).

Example 21. Synthesis of Ethyl 2-(2-(4-(4-(2,2,2-trifluoromethoxy)benzyl)piperazin-1-carbonyl-6-((5-(3-(4-trifluoromethyl)phenyl-1,2,4-oxadiazol-5-yl)pyridin-2-yl)oxy-1H-indol-1-yl)acetate (2h)

The product 2h was obtained using the same synthetic method as 2b by replacing bromoethane with bromo ethyl acetate, yield 53%. $^1$H NMR (500 MHz, DMSO-d$_6$) δ 9.08 (d, J=1.3 Hz, 1H), 8.83 (d, J=1.3 Hz, 1H), 8.33 (d, J=8.1 Hz, 2H), 8.00 (d, J=8.4 Hz, 2H), 7.72 (d, J=8.6 Hz, 1H), 7.62 (d, J=1.8 Hz, 1H), 7.28 (d, J=8.6 Hz, 2H), 7.07 (dd, J=8.5, 2.1 Hz, 1H), 7.02 (d, J=8.7 Hz, 2H), 6.82 (s, 1H), 5.13 (s, 2H), 4.74 (q, J=8.9 Hz, 2H), 4.08 (q, J=7.1 Hz, 2H), 3.78-3.59 (m, 4H), 3.47 (s, 2H), 2.44-2.34 (m, 4H), 1.17 (t, J=7.1 Hz, 3H).

Example 22. Synthesis of (1-benzyl-6-((5-(3-(4-(trifluoromethyl)phenyl)-1,2,4-oxadiazol-5-yl)pyrazin-2-yl)oxy-1H-indol-2-yl) (4-(4-(2,2,2-trifluoromethoxy)benzyl)piperazin-1-yl)methanone (2i)

The product 2i was obtained using the same synthetic method as 2b by replacing bromoethane with benzyl bromide, yield 70%. $^1$H NMR (500 MHz, DMSO-d$_6$) δ 9.07 (d, J=1.3 Hz, 1H), 8.82 (d, J=1.3 Hz, 1H), 8.33 (d, J=8.1 Hz, 2H), 8.00 (d, J=8.3 Hz, 2H), 7.71 (d, J=8.7 Hz, 1H), 7.29-7.21 (m, 5H), 7.08-7.04 (m, 3H), 7.01 (d, J=8.6 Hz, 2H), 6.76 (s, 1H), 5.49 (s, 2H), 4.74 (q, J=8.9 Hz, 2H), 3.61-3.45 (m, 4H), 3.37 (s, 2H), 2.37-2.24 (m, 2H), 2.06-1.94 (m, 2H).

Example 23. Synthesis of (4-benzylpiperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3a)

The method shown in Scheme 2 was used to obtain intermediate 3. Intermediate 3 (200 mg, 0.3 mmol), benzyl bromide (68 mg, 0.4 mmol) and potassium carbonate (166 mg, 1.2 mmol) were then dissolved in 3 mL of DMF and the reaction was stirred at room temperature for 1 h, the completion of the reaction was monitored by the TLC plate. The reaction was extracted with dichloromethane and water for three times, the organic phase was collected, the dichloromethane was removed by distillation under reduced pressure, and column chromatography was used to obtain (4-benzylpiperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3a, 160 mg, 74%). $^1$H NMR (DMSO-d$_6$, 500 MHz): δ 9.07 (d, J=1.5 Hz, 1H), 8.83 (d, J=1.0 Hz, 1H), 8.32 (d, J=8.0 Hz, 2H), 8.00 (d, J=8.5 Hz, 2H), 7.69 (d, J=9.0 Hz, 1H), 7.54 (d, J=2.0 Hz, 1H), 7.35-7.32 (m, 4H), 7.29-7.24 (m, 1H), 7.03 (dd, J=8.5, 2.0 Hz, 1H), 6.71 (s, 1H), 3.73 (s, 3H), 3.67-3.65 (m, 4H), 3.53 (s, 2H), 2.45-2.43 (s, 4H).

Example 24. Synthesis of (1-methyl-6-((5-(3-(4-(trifluoromethyl)phenyl)-1,2,4-oxadiazol-5-yl)pyrazin-2-yl)oxy-1H-indol-2-yl) (4-(3-methylbenzyl)piperazin-1-yl)methanone (3b)

3b was finally obtained using the same method for preparing compound 3a by replacing benzyl bromide with 3-methylbenzyl bromide, yield 78%. $^1$H NMR (DMSO-d$_6$, 500 MHz): δ 9.07 (s, 1H), 8.82 (s, 1H), 8.32 (d, J=8.5 Hz, 2H), 7.99 (d, J=8.5 Hz, 2H), 7.69 (d, J=8.5 Hz, 1H), 7.53 (s, 1H), 7.22 (dd, J=7.5, 2.0 Hz, 1H), 7.14-7.11 (m, 2H), 7.07 (d, J=7.5 Hz, 1H), 7.03 (dd, J=7.5, 2.0 Hz, 1H), 6.70 (s, 1H), 3.73 (s, 3H), 3.65-3.67 (m, 4H), 3.48 (s, 2H), 2.44-2.42 (m, 4H), 2.30 (s, 3H).

Example 25. Synthesis of (1-methyl-6-((5-(3-(4-(trifluoromethyl)phenyl)-1,2,4-oxadiazol-5-yl)pyrazin-2-yl)oxy)-1H-indol-2-yl) (4-(4-methylbenzyl)piperazin-1-yl)methanone (3c)

3c was finally obtained using the same method for preparing compound 3a by replacing benzyl bromide with 4-methylbenzyl bromide, yield 76%. $^1$H NMR (DMSO-d$_6$, 500 MHz): δ 9.07 (d, J=1.0 Hz, 1H), 8.82 (d, J=1.0 Hz, 1H), 8.33 (d, J=8.5 Hz, 2H), 8.00 (d, J=8.5 Hz, 2H), 7.69 (d, J=8.5 Hz, 1H), 7.53 (d, J=1.5 Hz, 1H), 7.21 (d, J=8.0 Hz, 2H), 7.14 (d, J=8.0 Hz, 2H), 7.03 (dd, J=8.5, 2.0 Hz, 1H), 6.70 (s, 1H), 3.73 (s, 3H), 3.67-3.65 (m, 4H), 3.48 (s, 2H), 2.43-2.41 (m, 4H), 2.28 (s, 3H).

Example 26. Synthesis of (4-(4-fluorobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3d)

3d was finally obtained using the same method for preparing compound 3a by replacing benzyl bromide with 4-fluorobenzyl bromide, yield 82%. $^1$H NMR (DMSO-d$_6$, 500 MHz): δ 9.07 (s, 1H), 8.82 (s, 1H), 8.33 (d, J=8.0 Hz, 2H), 8.00 (d, J=8.0 Hz, 2H), 7.69 (d, J=8.5 Hz, 1H), 7.54 (s, 1H), 7.38-7.35 (m, 2H), 7.16 (dd, J=8.5, 2.0 Hz, 2H), 7.04 (d, J=8.5 Hz, 1H), 6.71 (s, 1H), 3.73 (s, 3H), 3.65-3.67 (m, 4H), 3.52 (s, 2H), 2.45-2.43 (m, 4H).

Example 27. Synthesis of (4-(4-chlorobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3e)

3e was finally obtained using the same method for preparing compound 3a by replacing benzyl bromide with 4-chlorobenzyl bromide, yield 75%. $^1$H NMR (DMSO-d$_6$, 500 MHz): δ 9.07 (s, 1H), 8.82 (s, 1H), 8.33 (d, J=7.5 Hz, 2H), 8.00 (d, J=7.5 Hz, 2H), 7.69 (d, J=8.5 Hz, 1H), 7.54 (s, 1H), 7.40-7.35 (m, 4H), 7.03 (d, J=8.5 Hz, 1H), 6.71 (s, 1H), 3.73 (s, 3H), 3.67-3.65 (m, 4H), 3.53 (s, 2H), 2.45-2.43 (m, 4H).

Example 28. Synthesis of (4-(4-bromobenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3f)

3f was finally obtained using the same method for preparing compound 3a by replacing benzyl bromide with 4-bromobenzyl bromide, yield 84%. $^1$H NMR (DMSO-d$_6$, 500 MHz): δ 9.07 (d, J=1.0 Hz, 1H), 8.82 (d, J=1.0 Hz, 1H), 8.32 (d, J=8.0 Hz, 2H), 8.00 (d, J=8.0 Hz, 2H), 7.69 (d, J=8.5 Hz, 1H), 7.53 (d, J=8.5 Hz, 3H), 7.30 (d, J=8.5 Hz, 2H), 7.03 (dd, J=8.5, 2.0 Hz, 1H), 6.71 (s, 1H), 3.73 (s, 3H), 3.67-3.65 (m, 4H), 3.51 (s, 2H), 2.45-2.43 (m, 4H).

Example 29. Synthesis of (1-methyl-6-((5-(3-(4-(trifluoromethyl)phenyl)-1,2,4-oxadiazol-5-yl)pyrazin-2-yl)oxy)-1H-indol-2-yl)(4-(3-(trifluoromethyl)benzyl)piperazin-1-yl)methanone (3g)

3g was finally obtained using the same method for preparing compound 3a by replacing benzyl bromide with 3-(trifluoromethyl)benzyl bromide, yield 77%. $^1$H NMR (DMSO-d$_6$, 500 MHz): δ 9.07 (d, J=1.0 Hz, 1H), 8.82 (d, J=1.0 Hz, 1H), 8.32 (d, J=8.0 Hz, 2H), 8.00 (d, J=8.5 Hz, 2H), 7.70-7.57 (m, 5H), 7.54 (d, J=1.5 Hz, 1H), 7.04 (dd, J=8.5, 2.0 Hz, 1H), 6.71 (s, 1H), 3.73 (s, 3H), 3.69-3.67 (m, 4H), 3.64 (s, 2H), 2.48-2.46 (m, 4H).

Example 30. Synthesis of (1-methyl-6-((5-(3-(4-(trifluoromethyl)phenyl)-1,2,4-oxadiazol-5-yl)pyrazin-2-yl)oxy)-1H-indol-2-yl)(4-(4-(trifluoromethyl)benzyl)piperazin-1-yl)methanone (3h)

3h was finally obtained using the same method for preparing compound 3a by replacing benzyl bromide with 3-(trifluoromethyl)benzyl bromide, yield 86%. $^1$H NMR (DMSO-d$_6$, 500 MHz): δ 9.07 (s, 1H), 8.82 (s, 1H), 8.33 (d, J=8.0 Hz, 2H), 8.00 (d, J=8.5 Hz, 2H), 7.72-7.68 (m, 3H), 7.58 (d, J=8.0 Hz, 2H), 7.54 (s, 1H), 7.04 (dd, J=8.5, 2.0 Hz, 1H), 6.71 (s, 1H), 3.73 (s, 3H), 3.69-3.67 (m, 4H), 3.64 (s, 2H), 2.48-2.46 (m, 4H).

Example 31. Synthesis of (4-(4-methoxybenzyl)piperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3i)

3i was finally obtained using the same method for preparing compound 3a by replacing benzyl bromide with 4-methoxybenzyl bromide, yield 79%. $^1$H NMR (DMSO-d$_6$, 500 MHz): δ 9.07 (s, 1H), 8.83 (s, 1H), 8.33 (d, J=8.0 Hz, 2H), 8.00 (d, J=8.5 Hz, 2H), 7.69 (d, J=8.5 Hz, 1H), 7.54 (s, 1H), 7.21-7.24 (m, 2H), 7.03 (d, J=10.0 Hz, 1H), 6.88-6.90 (m, 2H), 6.70 (s, 1H), 3.74-3.73 (m, 7H), 3.65 (s, 3H), 3.46 (s, 2H), 2.42-2.40 (m, 4H).

Example 32. Synthesis of (1-methyl-6-((5-(3-(4-(trifluoromethyl)phenyl)-1,2,4-oxadiazol-5-yl)pyrazin-2-yl)oxy)-1H-indol-2-yl)(4-(3-(2,2,2-trifluoroethoxy)benzyl)piperazin-1-yl)methanone (3j)

3j was finally obtained using the same method for preparing compound 3a by replacing benzyl bromide with 3-(2,2,2-trifluoroethoxy)benzyl bromide, yield 70%. $^1$H NMR (DMSO-d$_6$, 500 MHz): δ 9.08 (d, J=1.0 Hz, 1H), 8.83 (d, J=1.0 Hz, 1H), 8.33 (d, J=8.0 Hz, 2H), 8.00 (d, J=8.5 Hz, 2H), 7.69 (d, J=9.0 Hz, 1H), 7.54 (s, 1H), 7.30 (d, J=8.0 Hz, 1H), 7.05-6.95 (m, 4H), 6.71 (s, 1H), 4.76 (q, J=9.0 Hz, 2H), 3.73 (s, 3H), 3.68-3.66 (m, 4H), 3.52 (s, 2H), 2.45-2.43 (m, 4H).

Example 33. Synthesis of (1-methyl-6-((5-(3-(4-(trifluoromethyl)phenyl)-1,2,4-oxadiazol-5-yl)pyrazin-2-yl)oxy)-1H-indol-2-yl)(4-(2-(2,2,2-trifluoroethoxy)benzyl)piperazin-1-yl)methanone (3k)

3k was finally obtained using the same method for preparing compound 3a by replacing benzyl bromide with 2-(2,2,2-trifluoroethoxy)benzyl bromide, yield 77%. $^1$H NMR (DMSO-d$_6$, 500 MHz): δ 9.07 (s, 1H), 8.83 (s, 1H), 8.32 (d, J=8.0 Hz, 2H), 8.00 (d, J=8.5 Hz, 2H), 7.69 (d, J=8.5 Hz, 1H), 7.54 (s, 1H), 7.39 (d, J=7.0 Hz, 1H), 7.28 (dd, J=8.0, 2.0 Hz, 1H), 7.11 (d, J=8.0 Hz, 1H), 7.06-7.03 (m, 2H), 6.70 (s, 1H), 4.76 (q, J=9.0 Hz, 2H), 3.72 (s, 3H), 3.69-3.67 (m, 4H), 3.55 (s, 2H), 2.48-2.46 (m, 4H).

Example 34. Synthesis of (1-methyl-6-((5-(3-(4-(trifluoromethyl)phenyl)-1,2,4-oxadiazol-5-yl)pyrazin-2-yl)oxy)-1H-indol-2-yl)(4-methylpiperazin-1-yl)methanone (3l)

3l was finally obtained using the same method for preparing compound 3a by replacing benzyl bromide with methyl iodide, yield 90%. $^1$H NMR (DMSO-d$_6$, 500 MHz): δ 9.08 (s, 1H), 8.83 (s, 1H), 8.33 (d, J=8.0 Hz, 2H), 8.00 (d, J=8.0 Hz, 2H), 7.70 (d, J=8.5 Hz, 1H), 7.54 (s, 1H), 7.04 (d, J=8.0 Hz, 1H), 6.72 (s, 1H), 3.73 (s, 3H), 3.65-3.67 (m, 4H), 2.40-2.38 (m, 4H), 2.24 (s, 3H).

Example 35. Synthesis of (4-ethylpiperazin-1-yl)(1-methyl-6-((5-(3-(4-(trifluoromethyl)phenyl)-1,2,4-oxadiazol-5-yl)pyrazin-2-yl)oxy)-1H-indol-2-yl)methanone (3m)

3m was finally obtained using the same method for preparing compound 3a by replacing benzyl bromide replaced with bromoethane, yield 88%. $^1$H NMR (DMSO-d$_6$, 500 MHz): δ 9.08 (d, J=1.0 Hz, 1H), 8.83 (d, J=1.0 Hz, 1H), 8.33 (d, J=8.0 Hz, 2H), 8.00 (d, J=8.5 Hz, 2H), 7.70 (d, J=8.5 Hz, 1H), 7.54 (s, 1H), 7.04 (dd, J=8.5, 1.5 Hz, 1H), 6.72 (s, 1H), 3.73 (s, 3H), 3.66-3.64 (m, 4H), 2.42-2.36 (m, 6H), 1.04-1.02 (m, 3H).

Example 36. Synthesis of (1-methyl-6-((5-(3-(4-(trifluoromethyl)phenyl)-1,2,4-oxadiazol-5-yl)pyrazin-2-yl)oxy-1H-indol-2-yl)(4-propylpiperazin-1-yl)methanone (3n)

3n was finally obtained using the same method for preparing compound 3a by replacing benzyl bromide with n-propyl bromide, yield 85%. $^1$H NMR (DMSO-d$_6$, 500 MHz): δ 9.08 (d, J=1.5 Hz, 1H), 8.83 (d, J=1.0 Hz, 1H), 8.33 (d, J=8.5 Hz, 2H), 8.00 (d, J=8.5 Hz, 2H), 7.70 (d, J=8.5 Hz, 1H), 7.54 (s, 1H), 7.04 (dd, J=8.5, 2.0 Hz, 1H), 6.71 (s, 1H), 3.73 (s, 3H), 3.65-3.63 (m, 4H), 2.42-2.40 (m, 4H), 2.27-2.29 (m, 2H), 1.48-1.46 (m, 2H), 1.24-1.22 (m, 3H).

Example 37. Synthesis of Methyl 2-(4-(1-methyl-6-((5-(3-(4-(trifluoromethyl)phenyl)-1,2,4-oxadiazol-5-yl)pyrazin-2-yl)oxy)-1H-indol-2-carbonyl)piperazin-1-yl)acetate (3o)

3o was finally obtained using the same method for preparing compound 3a by replacing benzyl bromide with methyl bromoacetate, yield 82%. $^1$H NMR (DMSO-d$_6$, 500 MHz): δ 9.08 (d, J=1.0 Hz, 1H), 8.83 (d, J=1.0 Hz, 1H), 8.33 (d, J=8.0 Hz, 2H), 8.00 (d, J=8.5 Hz, 2H), 7.70 (d, J=8.5 Hz, 1H), 7.54 (d, J=1.5 Hz, 1H), 7.04 (dd, J=8.5, 2.0 Hz, 1H), 6.71 (s, 1H), 3.73 (s, 3H), 3.68-3.66 (m, 4H), 3.63 (s, 3H), 3.33 (s, 2H), 2.60-2.58 (m, 4H).

Example 38. Synthesis of 2-chloro-1-(4-(1-methyl-6-((5-(3-(4-(trifluoromethyl)phenyl)-1,2,4-oxadiazol-5-yl)pyrazin-2-yl)oxy)-1H-indol-2-carbonyl)piperazin-1-yl)ethanone (3p)

3p was finally obtained using the same method for preparing compound 3a by replacing benzyl bromide replaced with chloroacetyl chloride, yield 72%. $^1$H NMR (DMSO-d$_6$, 500 MHz): δ 9.08 (d, J=1.5 Hz, 1H), 8.83 (d, J=1.0 Hz, 1H), 8.33 (d, J=8.0 Hz, 2H), 8.00 (d, J=8.5 Hz, 2H), 7.71 (d, J=8.5 Hz, 1H), 7.56 (d, J=1.5 Hz, 1H), 7.06 (dd, J=8.5, 2.0 Hz, 1H), 6.79 (s, 1H), 4.44 (s, 2H), 3.76 (s, 3H), 3.75-3.72 (m, 2H), 3.69-3.67 (m, 2H), 3.59-3.57 (m, 4H).

Example 39. Synthesis of (1-methyl-6-((5-(3-(4-(trifluoromethyl)phenyl)-1,2,4-oxadiazol-5-yl)pyrazin-2-yl)oxy-1H-indol-2-yl)(4-(4-(trifluoromethyl)benzoyl)piperazin-1-yl)methanone (3q)

Intermediate 3 was weighed and the Boc group was removed. The intermediate with Boc group removed (200 mg, 0.3 mmol), 4-trifluoromethylbenzoic acid (76 mg, 0.4 mmol), HATU (155 mg, 0.4 mmol) and DIEA (155 mg, 1.2 mmol) were then weighed and dissolved in 4 mL of DMF and stirred for 4 h at room temperature, the completion of the reaction was monitored by the TLC plate. The reaction was extracted with dichloromethane and water for 3 times, the organic phase was collected, the dichloromethane was removed by distillation under reduced pressure, and purified via column chromatography to obtain final product 3q (188 mg, 77%). 1H NMR (DMSO-$d_6$, 500 MHz): δ 9.08 (s, 1H), 8.84 (s, 1H), 8.33 (d, J=7.5 Hz, 2H), 8.00 (d, J=8.0 Hz, 2H), 7.85 (d, J=7.5 Hz, 2H), 7.71-7.67 (m, 3H), 7.56 (s, 1H), 7.05 (d, J=8.0 Hz, 1H), 6.78 (s, 1H), 3.79-3.76 (m, 7H), 3.68-3.70 (m, 2H), 3.43-3.41 (m, 2H).

Example 40. Binding Activity with STAT3 Protein and Anti-Tumor Proliferative Activity of Examples 1-39

1. Technical Methods (1) Determination of Binding Activities of Compounds to STAT3 Protein by Microscale Thermophoresis (MST) Method The microscale thermophoresis (MST) technique is a simple, rapid, and accurate method for quantifying biomolecular interactions. It can measure the movement of molecules in a microscopic temperature gradient field, as well as detect changes of molecular hydration shell, charge and size. When the Nanotemper microscale thermophoresis instrument locally heated by a infrared laser, molecules will move in a directional manner, then the molecular distribution ratio in the temperature gradient field are analyzed by a fluorescence to detect whether a small molecule compound binds to a target protein. The experimental operation is as follows: firstly, compounds to be tested are diluted in a gradient using MST test buffer, total 16 concentrations being configured; subsequently, the purified STAT3 recombinant protein is labeled using the HIS tag labeling kit, and the final concentration of the labeled protein is 100-200 nM; the labeled STAT3 proteins are well mixed with the diluted compounds and incubated and protected from light for 30 minutes; finally the samples were loaded by capillary tube and detected on the instrument. The binding constants ($K^D$) of small molecules to STAT3 protein were analyzed by Mo. analysis software.

(2) Detection of Cell Proliferation by MTS Method

The MTS assay is a method for indirectly determining the number of living cells via colourimetric method. MTS is a newly synthesised tetrazole compound that reflects cell viability, which can be reduced by succinate dehydrogenase in the mitochondria of living cells to an orange-coloured formazan with an absorbance of the reduced product measured at 490 nm being in proportion to the number of living cells, thus reflecting the cell viability. This assay can be used to evaluate the effect of the compound on the proliferation of pancreatic cancer cells, thereby determining the inhibitory effect of the compound on the proliferation of pancreatic cancer cells and to calculate the $IC^{50}$. Each cells were inoculated uniformly into a 96-well plate at a density of $1-20\times10^3$ cells/well, 100 μL per well, and placed in a constant temperature incubator until the cells adhered to the wall. The control group was added with the corresponding medium and the experimental groups were given different concentrations of the compound prepared by the examples of the present invention, and the cells were taken out 24-96 h after administration for observing the cell state under a microscope. Under light-proof conditions, MTS was added and well mixed, the mixture was placed in a constant temperature incubator at 37° C., and the light absorption value were measured using an enzyme marker at 490 nm and the experiment was repeated for three times, $IC_{50}$ was calculated with GraphPad5 Prism software.

The binding activities of Examples 1-39 to STAT3 protein are indicated as $K_D$ (association-dissociation constant) and the anti-proliferative activities of Examples 1-39 against pancreatic, gastric, hepatic and lung cancers are indicated as $IC_{50}$ (half inhibition concentration), the results of the above tests are shown in Table 1.

TABLE 1

Results of in vitro binding activity tests of Examples 1-39 to STAT3 protein

| | binding activity to | Tumour cell proliferative activity/$IC_{50}$(nM) | | | |
|---|---|---|---|---|---|
| | STAT3 protein $K_D$ (nM) | Pancreatic Cancer Capan-2 | gastric Cancer MKN45 | Liver Cancer Huh7 | Lung Cancer HCC827 |
| Example 1 | <10 | <10 | <10 | <10 | <10 |
| Example 2 | <10 | <10 | <10 | <10 | <10 |
| Example 3 | <10 | <10 | <10 | <10 | <10 |
| Example 4 | <10 | <10 | <10 | <10 | <10 |
| Example 5 | <10 | <10 | <10 | <10 | <10 |
| Example 6 | <10 | <10 | <10 | <10 | <10 |
| Example 7 | <1 | <1 | <1 | <1 | <1 |
| Example 8 | <1 | <1 | <1 | <1 | <1 |
| Example 9 | <10 | <10 | <10 | <10 | <10 |
| Example 10 | <10 | <10 | <10 | <10 | <10 |
| Example 11 | <10 | <10 | <10 | <10 | <10 |
| Example 12 | <10 | <10 | <10 | <10 | <10 |
| Example 13 | <10 | <10 | <10 | <10 | <10 |
| Example 14 | <100 | <100 | <100 | <100 | <100 |
| Example 15 | <10 | <10 | <10 | <10 | <10 |
| Example 16 | <100 | <100 | <100 | <100 | <100 |
| Example 17 | <10 | <10 | <10 | <10 | <10 |
| Example 18 | <100 | <100 | <100 | <100 | <100 |
| Example 19 | <10 | <10 | <10 | <10 | <10 |
| Example 20 | <1000 | <1000 | <1000 | <1000 | <1000 |
| Example 21 | <100 | <1000 | <1000 | <1000 | <1000 |
| Example 22 | <100 | <1000 | <1000 | <1000 | <1000 |
| Example 23 | <100 | <1000 | <1000 | <1000 | <1000 |
| Example 24 | <100 | <1000 | <1000 | <1000 | <1000 |
| Example 25 | <100 | <100 | <100 | <100 | <100 |
| Example 26 | <1000 | <1000 | <1000 | <1000 | <1000 |
| Example 27 | <100 | <100 | <100 | <100 | <100 |
| Example 28 | <100 | <100 | <100 | <100 | <100 |
| Example 29 | <1000 | <1000 | <1000 | <1000 | <1000 |
| Example 30 | <1000 | <1000 | <1000 | <1000 | <1000 |
| Example 31 | <100 | <100 | <100 | <100 | <100 |
| Example 32 | <100 | <100 | <100 | <100 | <100 |
| Example 33 | <100 | <1000 | <1000 | <1000 | <1000 |
| Example 34 | <100 | <1000 | <1000 | <1000 | <1000 |
| Example 35 | <100 | <1000 | <1000 | <1000 | <1000 |
| Example 36 | <100 | <1000 | <1000 | <1000 | <1000 |
| Example 37 | <100 | <1000 | <1000 | <1000 | <1000 |
| Example 38 | <100 | <1000 | <1000 | <1000 | <1000 |
| Example 39 | <100 | <1000 | <1000 | <1000 | <1000 |

2. Conclusions

The results of the experiments are shown in Table 1. All compounds of Examples 1-39 of the present invention exert their anti-tumour activity via binding to STAT3. Most of the compounds of the present invention have half effective proliferation inhibition concentration ($IC_{50}$) of less than 10 nM against a variety of tumour cells, and all compounds have $IC_{50}$ of less than 1 μM against a variety of tumour cells; and the compounds of Examples 1-39 have similar inhibitory activity against different types of tumor, such as pancreatic cancer, gastric cancer, liver cancer and lung cancer, indicating that the compounds of the present invention have excellent anti-tumor activities against a variety of tumors in vitro.

Example 41. Anti-Proliferative Activity of Representative Compound Example 6 (WB737) and Other Compounds of the Present Invention (Examples 1-5 and 7-39) Against Different Types of Cancer Cells

1. Technical Methods

Same as Example 40.

The anti-proliferative activity of WB737 was detected on representative tumours selected from different types of tumours and the anti-proliferative activities are indicated as $IC_{50}$ (half inhibition concentration). The results of above tests are shown in Table 2.

TABLE 2

Results of the anti-proliferative activity test of Example 6 (WB737) against different types of cancer cells

|  | cell line | $IC_{50}$(nM) | Tumour | cell line | $IC_{50}$(nM) |
|---|---|---|---|---|---|
| Pancreatic Cancer | Capan-2 | 9.4 + 0.7 | Lung Cancer | A549 | 11.9 + 1.3 |
|  | PANC-1 | 8.1 + 0.5 |  | H460 | 4.6 + 0.4 |
|  | MIAPACA-2 | 8.8 + 0.5 |  | H23 | 2.9 + 0.2 |
|  | BXPC3 | 7.6 + 0.7 |  | H1299 | 26.0 + 2.1 |
|  | SW1990 | 1.3 + 0.02 |  | H522 | 12.0 + 1.8 |
|  | CFPAC-1 | 3.1 + 0.03 |  | H1975 | 11.7 + 0.7 |
| gastric Cancer | MKN45 | 1.6 + 0.1 |  | PC-9 | 21.3 + 2.9 |
|  | BGC823 | 6.1 ± 0.9 |  | HCC827 | 0.5 + 0.1 |
|  | MGC803 | 3.6 + 0.3 | Liver Cancer | PLC/PRF-5 | 1.8 + 0.4 |
| Prostate Cancer | DU145 | 12.4 + 0.4 |  | Huh7 | 8.6 + 0.2 |
|  | LNCAP | 10.3 + 0.2 |  | HepG2 | 12.0 + 3.0 |
| Colon Cancer | HCT8 | 20.9 + 0.8 |  | SK-hep1 | 18.6 + 0.8 |
|  | HT29 | 31.6 + 4.6 |  | SMMC7721 | 6.4 + 0.3 |
|  | HCT-116 | 11.3 + 0.2 |  | HCCC9810 | 73.3 + 5.1 |

2. Conclusions

Experimental results are shown in Table 2. The $IC_{50}$ of the anti-proliferative activity of Example 6 (WB737) against different types of cancer cells are in the range of 0.5-32 nM, and for each different type of tumours, various different cancer cell lines were tested in the present invention, and WB737 shows potent anti-tumour activity.

In addition, similar experimental results show that the other compounds of the present invention (Examples 1-5 and 7-39) also have excellent anti-tumour effects against tumour cells of different tumours.

Example 42. Inhibitory Effects of Representative Compound Example 6 (WB737) and Other Compounds of the Present Invention (Examples 1-5 and 7-39) Against Bifunctional Phosphorylation of $STAT3^{Y705/S727}$ in Different Types of Cancer Cells

1. Technical Methods (1) Western Blot

After cells were treated with different concentrations of WB737 for 12-24 h, the cells were washed with PBS, lysed by adding RIPA Lysis buffer, phosphatase inhibitor and protease inhibitor, then the cell lysates were centrifuged, quantified, denatured by boiling, protein samples were separated by on polyacrylamide gels SDS-PAGE electrophoresis, then transferred to nitrocellulose films and blocked by BSA blocking solution for 1 h, incubated with antibodies STAT3, p-STAT3$^{Tyr705}$, p-STAT3$^{Ser727}$ and GAPDH overnight at 4° C., respectively, and then incubated with secondary antibodies with fluorescent label for 1 h. Finally, the expression levels of protein were detected by Odyssey scanner.

2. Conclusions

The experimental results are shown in FIG. 1. FIG. 1A shows the inhibitory effect of WB737 on phosphorylation in pancreatic cancer cells, WB737 can completely inhibit the expression of STAT3-Tyr705 and Ser727 in pancreatic cancer cells at lower than 50 nM; FIG. 1B shows the inhibitory effect of WB737 on $STAT3^{Y705/S727}$ bifunctional phosphorylation in each cell lines of liver cancer, and the results show WB737 can completely inhibit phosphorylation of $STAT3^{Y705/S727}$ bifunctional phosphorylation site in majority of liver cancer cells at a concentration of 10 nM-100 nM; FIG. 1C shows that WB737 inhibits phosphorylation of $STAT3^{Y705/S727}$ bifunctional phosphorylation site in gastric cancer cells at concentrations of 10 nM to 100 nM. FIG. 1D shows that WB737 inhibits phosphorylation of $STAT3^{Y705/S727}$ bifunctional phosphorylation site in colon cancer cells at concentrations of 10 nM to 100 nM. In addition, results from similar experiments also show that other compounds of the present invention (Examples 1-5 and 7-39) completely inhibit phosphorylation of $STAT3^{Y705/S727}$ bifunctional phosphorylation site in different tumour cells at concentrations of 1-100 nM.

Example 43. In Vivo Anti-Tumour Effect of Representative Compound Example 6 (WB737)

1. Technical Methods (1) Subcutaneous Tumor-Bearing Experiment in Nude Mice Subcutaneous tumor-bearing experiment, i. e. tumour cells were injected subcutaneously into nude mice, and the tumour cells absorbed nutrients from the mice and rapidly proliferated to form tumours. The mice were then grouped to perform the experiment, and in the experimental groups, mice were treated with the drugs, so that the in vivo inhibitory effect of the drugs on the tumours could be observed.

(1-10)×10$^6$ human pancreatic cancer cells PANC-1 and MIAPACA-2 were injected subcutaneously into the right side of the back of immunodeficient mice (BALB/c-nude, nude mice, 5-6 weeks), and when the tumours grew to about 100 mm$^3$, the mice were evenly divided into five groups, i. e. blank control group; 5 mg/kg WB737 low-dose group; 10 mg/kg WB737 medium-dose group; 20 mg/kg WB737 high-dose group; 10 mg/kg IACS-010759 positive control group; all the above compounds were formulated with 0.5% MC and administered by gavage. Tumour volume and mouse weight were measured every four days, and tumour volume was calculated according to the formula of volume=length×width$^2$×0.52. After 3 weeks post-administration, mice were sacrificed and subcutaneous tumours were peeled off, weighed and photographed.

(2) WB Experiments of Tumour Tissue

Tumours from each group of mice were peeled off, washed with PBS and the tumours were respectively ground with liquid nitrogen, followed by treated with different concentrations of WB737 for 12-24 h, the cells were washed with PBS, lysed by adding RIPA Lysis buffer, phosphatase inhibitor and protease inhibitor, then the cell lysates were centrifuged, quantified, denatured by boiling, protein samples were separated by polyacrylamide gels SDS-PAGE electrophoresis, then transferred to nitrocellulose films and blocked by BSA blocking solution for 1 h, respectively incubated with antibodies such as STAT3, p-STAT3$^{Tyr705}$, p-STAT3$^{Ser727}$ and GAPDH overnight at 4° C., respectively, and then incubated with secondary antibodies with fluorescent label for 1 h. Finally, the expression levels of protein were detected by Odyssey scanner.

(3) Immunohistochemical Experiment

The subcutaneous tumors of pancreatic cancer in each group of mice were peeled off, fixed with 4% paraformaldehyde, dehydrated, paraffin-embedded and sectioned, then dewaxed, performed antigen retrieval, removal of catalase, blocking of antigenic sites, incubated with primary antibodies of p-STAT3$^{Tyr705}$ and p-STAT3$^{Ser727}$ then secondary antibodies, coloration, stained with hematoxylin; after dehydration and sealing slide, then observed under a microscope and photographed, and the expression contents of p-STAT3$_{Tyr705}$ and p-STAT3$^{Ser727}$ in the pancreatic cancer tumors of each group of mice were detected.

2. Conclusions

Figure 2:
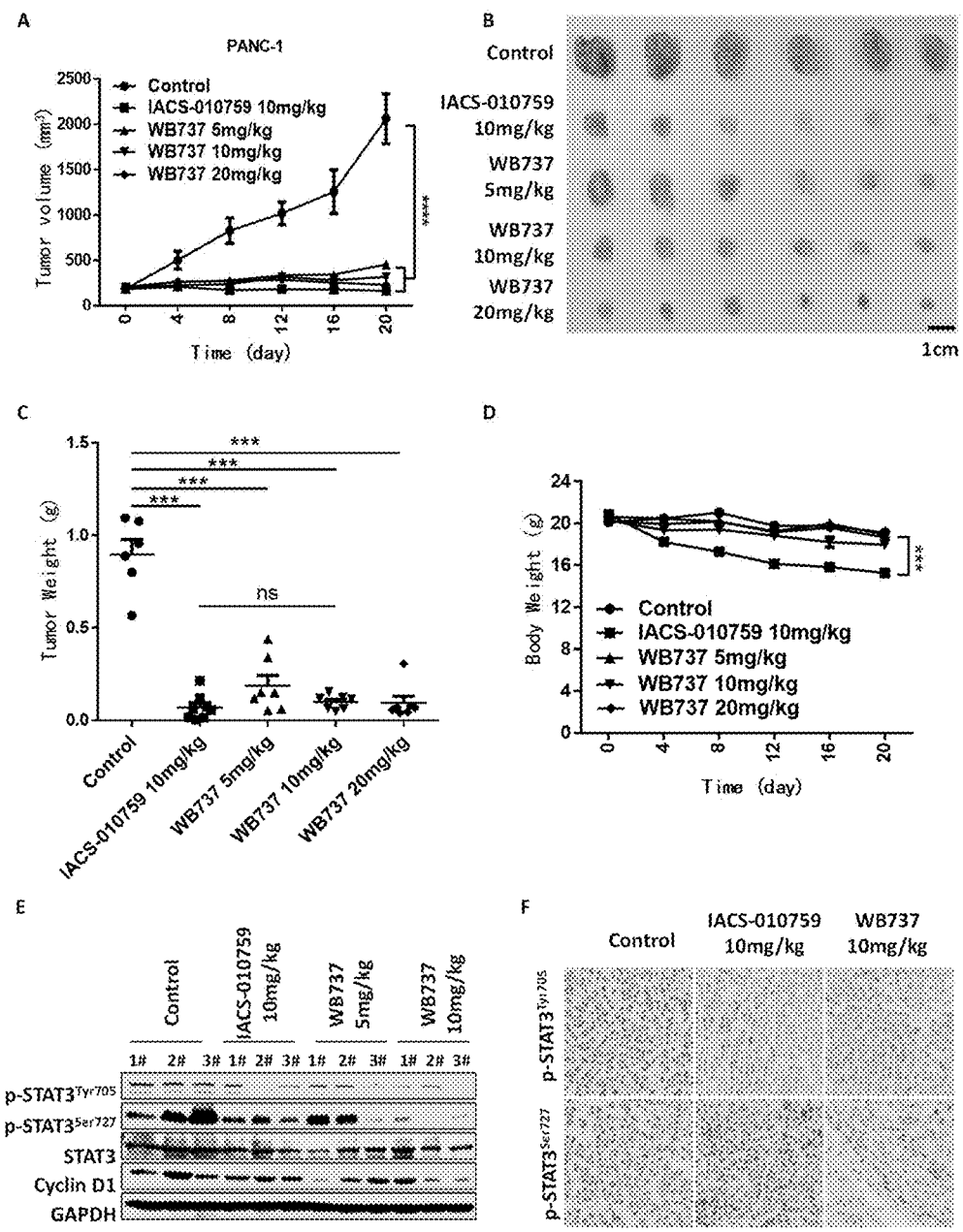
FIG. 2 shows the inhibitory effect of representative compound example 6 (No. WB737) on the growth of human pancreatic cancer cells PANC-1 in vivo. Wherein (A) represents the change curve of tumor volume in different treatment groups; (B) represents the white-light plot of PANC-1 tumor in different treatment groups; (C) represents the statistical plot of PANC-1 tumor weight in different treatment groups; (D) represents the change curve of mouse body weight in different treatment groups; (E) shows the protein expression of STAT3, p-$STAT3^{Tyr705}$, p $STAT3^{Ser727}$, Cyclin D1, GAPDH in tumor tissues of different treatment groups; (F) shows the immunohistochemical results of tumor tissues of different treatment groups, and the expressed proteins being detected are p-$STAT3^{Tyr705}$ and p-$STAT3^{Ser727}$, indicating that WB737 inhibited the growth of pancreatic cancer by targeting STAT3 in vivo.
Figure 3:
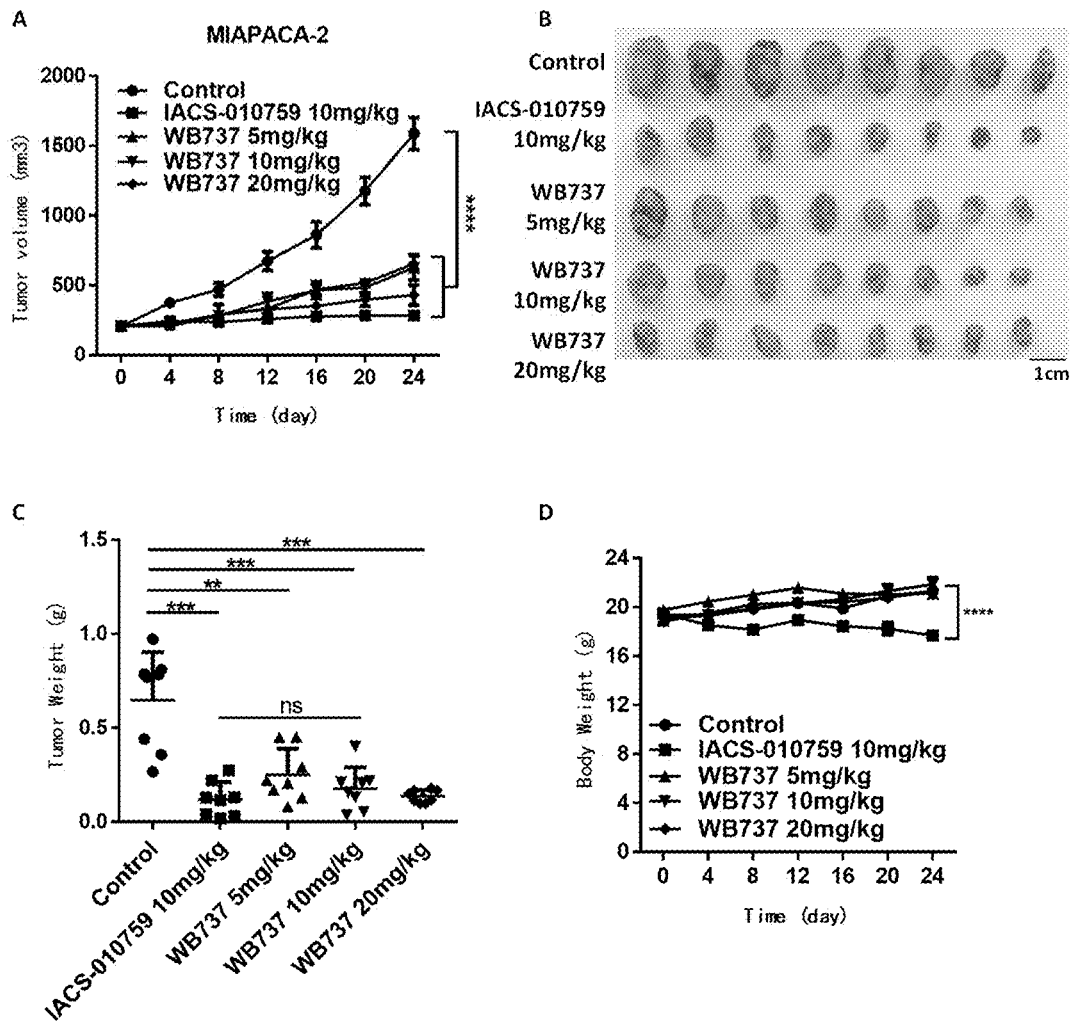
FIG. 3 shows the inhibitory effect of representative compound example 6 (No. WB737) on the growth of human pancreatic cancer cell strain MIAPACA-2 in vivo. Wherein (A) represents the change curve of tumor volume in different treatment groups; (B) represents the white-light plot of MIAPACA-2 tumor in different treatment groups; (C) represents the statistical plot of MIAPACA-2 tumor weight in different treatment groups; (D) represents the change curve of mouse body weight in different treatment groups.

As shown in FIGS. 2 and 3, WB737 significantly inhibits the growth of pancreatic tumour in the animal model of pancreatic cancer, and the inhibitory effect thereof is comparable to that of the positive drug IACS-010759. The results are shown in FIG. 2A, FIG. 2B, FIG. 2C, FIG. 2A, FIG. 3B and FIG. 3C. WB737 can significantly inhibit tumor growth, showing significant differences from the control group in terms of both tumor volume and tumor weight. More importantly, as shown in FIG. 2D and FIG. 3D, WB737 has a better safety profile compared to the positive compound IACS-010759. The positive compound IACS-010759 has a great effect on the body weight of mice, showing a significant difference compared to the control group, while the WB737 group has no significant effect on the body weight of mice and is more tolerant and safer compared to the control group. As shown in FIG. 2E and FIG. 2F, the results of WB and IHC experiments, WB737 dose-dependently inhibits phosphorylation of STAT3$^{Y705/S727}$ bifunctional phosphorylation site in vivo, and the above results support that WB737 realize the inhibition of pancreatic tumor growth mainly through inhibition of STAT3 signaling pathway. In summary, WB737 can inhibit the growth of pancreatic tumours in a mouse model by targeting STAT3.

Example 44. In Vivo Anti-Tumour Metastatic Effects of the Representative Compound WB737

(1) Animal Experiment on Pancreatic Cancer Liver Metastasis

Pancreatic cancer is a malignant tumor of the gastrointestinal tract, with rapidly progressing condition, high degree of progression, and very limited clinical treatments, and metastasis is very likely to occur in the terminal stage, among which liver metastasis is the most common, and the occurrence of liver metastasis is also an important manifestation of the seriousness of the disease. In the present invention, by injecting pancreatic cancer cells into the spleen, the tumour cells will directed metastasize to the liver, thereby simulating the occurrence and metastasis process of pancreatic cancer liver metastasis. The specific experimental operation is as follows: mouse pancreatic cancer cells Pan02-Luci were injected into the spleen of C57BL/6 mice with appropriate age, with more than 6 mice in each group. Fluorescence detection of mice was performed using the Small Animal In vivo Imaging Instrument (IVIS), according to the obtained fluorescence values, the mice were divided into control group, WB737 5 mg/kg/d low dose group, 10 mg/kg/d medium dose group and 20 mg/kg/d high dose group, and IACS-010759-10 mg/kg positive compound group, and the mean fluorescence values of each group were ensured to be consistent. Mice were administered different doses of WB737 or the positive compound by gavage, and mice of control group were administered the same dose of solvent orally by gavage, dosing once a day. Metastasiss were recorded using small animal in vivo imaging instrument (IVIS) during the experiment, and body weight of the mice was measured every 3-4 days. After a certain number of days post-administration, the mice were sacrificed and the metastatic lesion were observed and recorded under a dissecting microscope. The tumours were peeled off, and fixed for subsequent experiments such as immunohistochemical analysis and western blot. Pancreatic cancer liver metastasis survival experiment was the same as the above liver metastasis experiment, during the experiment, the time and number of mice died due to pancreatic cancer liver metastasis were counted, and the results of the experiment were counted and survival curves were plotted.

(2) In situ growth metastasis model of pancreatic cancer. Human pancreatic cancer cells (ASPC-1) were used to bear tumors in the pancreas of age-appropriate nude mice, 6 or more mice in each group. One week after injection of tumour cells, all mice were randomly divided to the control group, WB737-5 mg/kg low dose group, 10 mg/kg medium dose group, 20 mg/kg high dose group and positive compound group. Different doses of WB737 or the positive compound were administered by gavage, and mice of control group were administered the same dose of solvent orally by injection, dosing once a day. During the experiment, the time and number of mice died due to pancreatic cancer metastasis were counted, and the results of the experiment were counted and survival curves were plotted.

2. Conclusions

Figure 4:
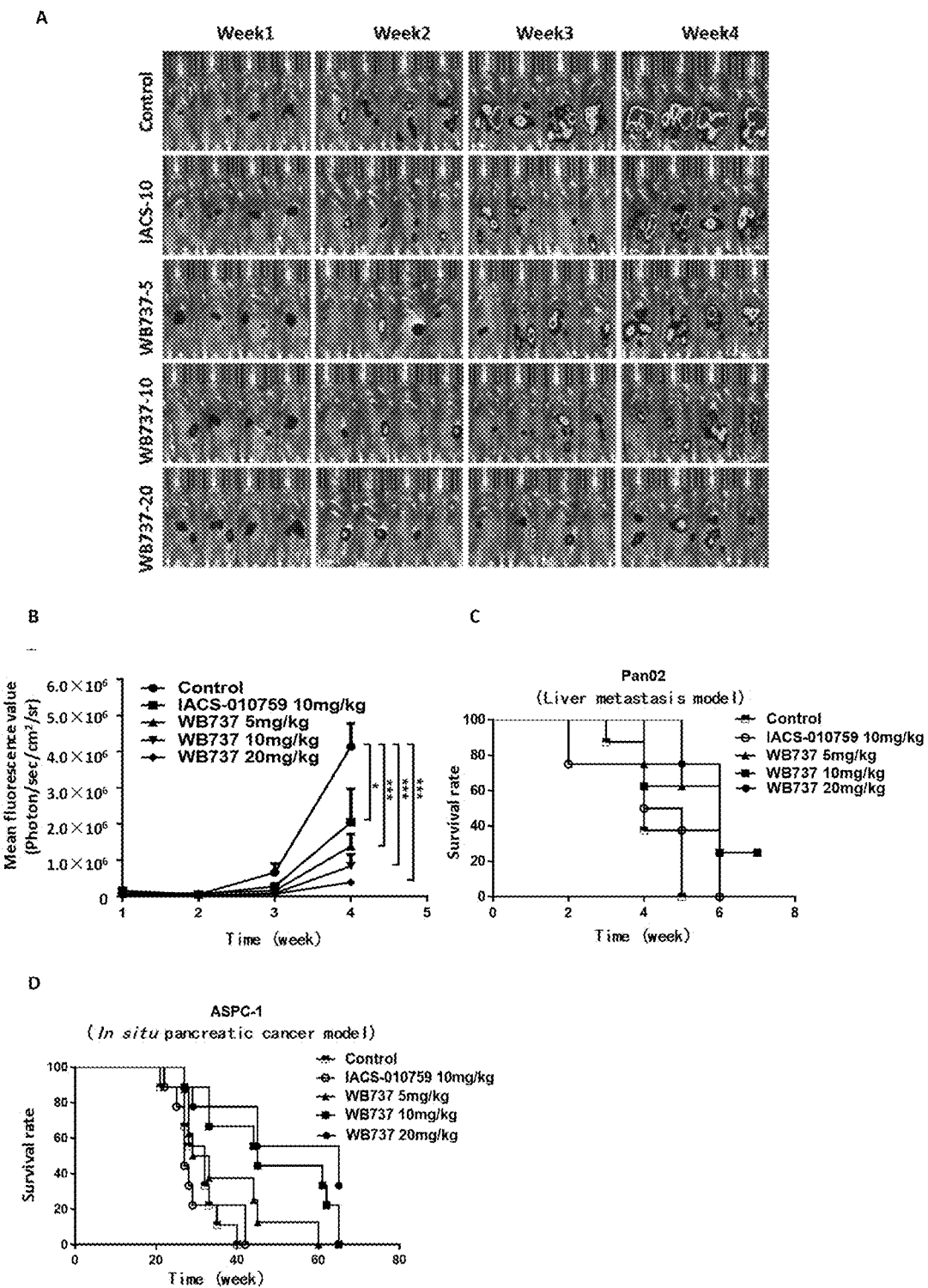
FIG. 4 shows the inhibitory effect of representative compound example 6 (No. WB737) on the growth and metastasis of pancreatic cancer cell strain Pan02, ASPC-1 in vivo. Wherein (A) and (B) represent the effect of WB737 on inhibition of liver metastasis of pancreatic cancer cells Pan02; (C) represents the effect of WB737 on prolonging the survival of liver metastasis model mice constructed with pancreatic cancer cells Pan02; (C) represents the effect of WB737 on prolonging the survival of in situ pancreas model mice constructed with pancreatic cancer cells ASPC-1.

As shown in FIG. 4, WB737 inhibits liver metastasis and in situ growth of pancreatic tumours in mice and prolongs the survival of the above tumour models mice. As shown in FIG. 4A and FIG. 4B, WB737 dose-dependently inhibits liver metastasis of tumours in a pancreatic tumour liver metastasis model, with significantly better inhibitory effect than the positive compound IACS-010759. FIG. 4C and FIG. 4D show that WB737 significantly prolongs the survival of mice in pancreatic tumour liver metastasis model and in situ growth metastasis model with a significant dose-dependence, and the inhibitory effects thereof are superior to that of positive compound IACS-010759. In summary, WB737 inhibits growth and metastasis of pancreatic tumor and significantly prolongs the survival of mice in a pancreatic tumor metastasis model by targeting STAT3.

In addition, results from similar experiments also show that other compounds of the present invention (Examples 1-5 and 7-39) can also inhibit the growth and metastasis of different tumors by targeting STAT3 and significantly prolong the survival of tumor-bearing mice and greatly prevent or alleviate tumor growth.

Example 44. The Advantages of Representative Compound Example 6 (No. WB737), Compared to the Positive Compound, in Terms of Target Binding, Cell Viability, and Safety, Etc.

1. Technical Methods (1) Microscale Thermophoresis Experiment
 The method is as described in Example 40.
(2) Subcutaneous Animal Experiment on Mice
 The method is as described in Example 43.

2. Conclusions

Figure 5:
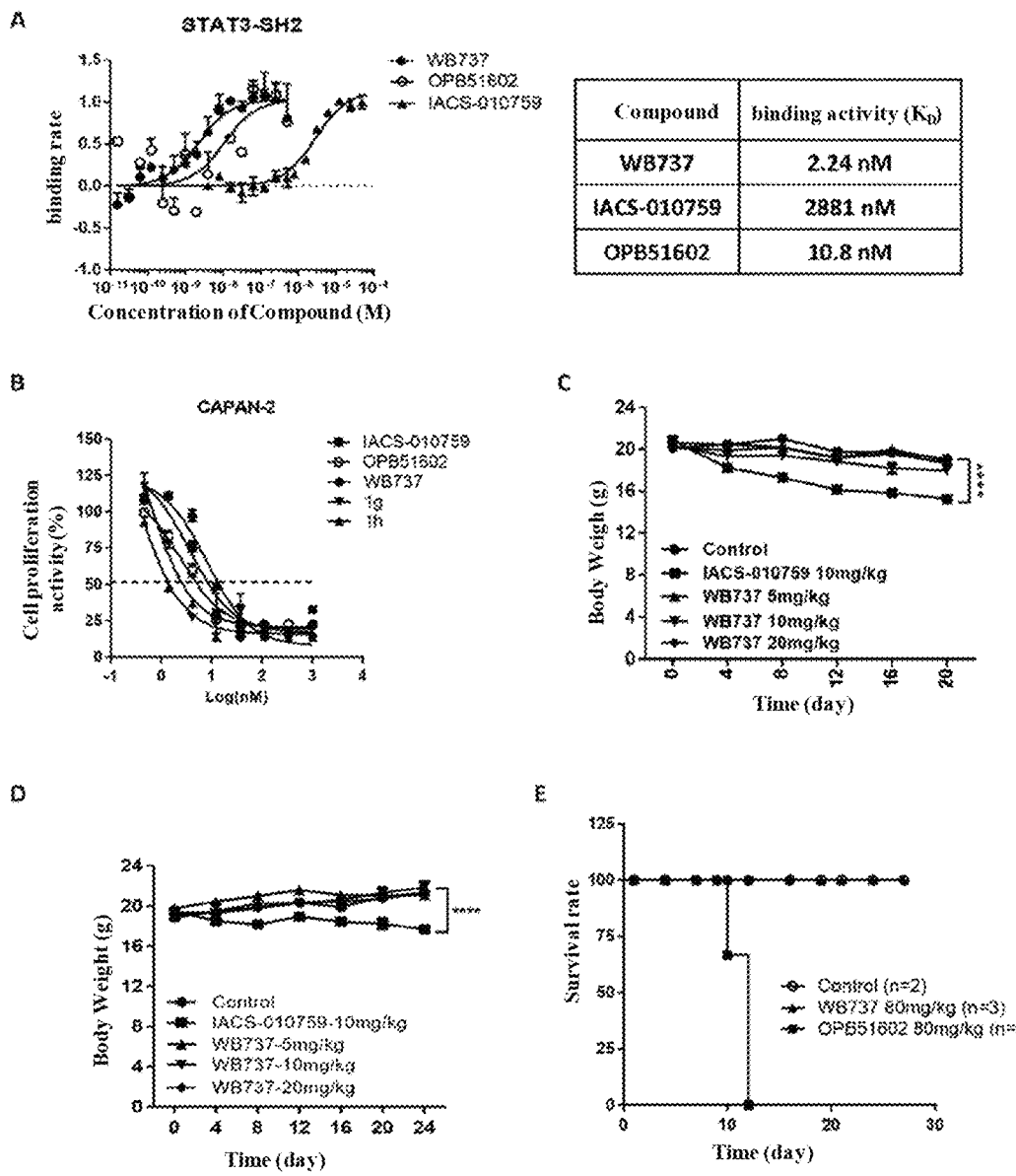
FIG. 5 shows the advantages of representative compound example 6 (No. WB737), compared to the positive compound, in terms of target binding, safety, etc. Wherein (A) represents the binding curves of WB737 and IACS-010759 to the STAT3-SH2 domain; (B) represents the effect of WB737(1g, 1h) and positive compound on inhibiting the proliferation of pancreatic cancer cell strain Capan-2; (C) represents the effect of WB737 and IACS-010759 on mouse body weight in a subcutaneous animal model constructed with pancreatic cancer cells PANC-1; (C) represents the effect of WB737 and IACS-010759 on mouse body weight in a subcutaneous animal model constructed with pancreatic cancer cells MIAPACA-2; (E) represents the effect of WB737 and OPB51602 on the survival of normal mice.

As shown in FIG. 5, positive compound OPB51602 is first disclosed in patent WO2009057811 and an article published in 2017 (Davide Genini et al., PNAS, 2017) reported that OPB51602 has STAT3 inhibitory activity. Positive compound IACS-010759 is a first inhibitor of oxidative phosphorylation targeting respiratory chain complex 1 (Molina J R et al., Nat Med., 2018) and its structure is first disclosed in patent WO2014031936. In Example 44 of the present invention, the advantages of the compounds of the present invention over the positive compounds IACS-101759 and OPB-51602 were evaluated in terms of target affinity, inhibition of tumour cell proliferation activity, and safety etc. As shown in FIG. 5A, WB737 has an affinity of 2.25 nM for the STAT3 SH2 domain, while OPB51602 has an affinity of 10.8 nM for the STAT3 SH2 domain and IACS-010759 has an affinity of 2780 nM for the STAT3 SH2domain, thus indicating that the compounds of the present invention are significantly better than the positive compounds IACS-010759 and OPB51602 in terms of target affinity. As shown in FIG. 5B, the activities to inhibit proliferation of pancreatic cancer cells of compounds 1g (IC$_{50}$=0.49 nM) and 1h (IC$_{50}$=0.34 nM) of the present invention are superior to that of the positive compounds OPB51602 (IC$_{50}$=2.5 nM) and IACS-010759 (IC$_{50}$=2.7 nM), and the anti-tumor proliferative activity of the compounds 1g and 1h disclosed in the present invention are improved 10 times than representative compounds OPB51602 and IACS-010759 in patent WO2009057811 and WO2014031936 which entered into clinical trial. The toxicity of IACS-101759 was first reported in (Molina J R et al., Nat Med., 2018), all mice died at a dose of 25 mg/kg in the mouse model; as shown in FIGS. 5C and 5D, compound WB737 of the present invention shows good tolerability in both mouse models, whose safety profile is significantly better than the positive compound IACS-101759 at the same dose. The safety of OPB51602 has not yet been reported. Acute toxicological experiments were designed to verify the safety of WB737 of the present invention and OPB51602; as shown in FIG. 5E, there are no mice died at a dose of 80 mg/kg for the compound WB737 of the present, while all mice died at a dose of 80 mg/kg for the positive compound OPB51602, showing that the safety of the compounds of the present invention is significantly better than that of similar compounds currently disclosed.

The invention claimed is:

1. A triaromatic compound targeting bifunctional phosphorylation site of STAT3, or a pharmaceutically acceptable salt thereof, wherein the triaromatic compound is a compound of formula (III):

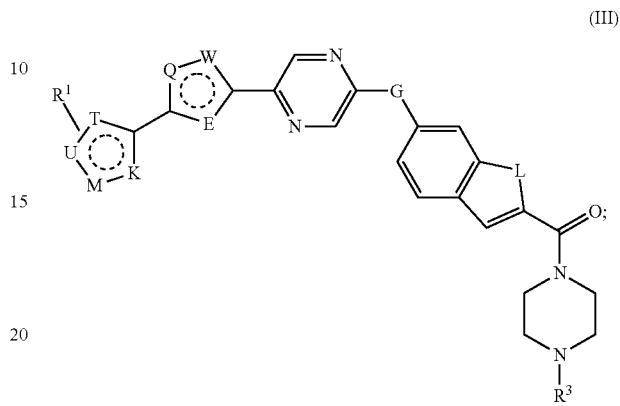

(III)

wherein
W, Q, E, T, U, M and K are each independently selected from the group consisting of CH, CH=CH, CH=NH, NH, N, O and S;
G and L are each independently selected from the group consisting of NH, NR$^2$, O, and S;
R$^1$ is selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl is substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, R$^6$ are each independently hydrogen, or C$_{1-4}$alkyl, p is 0, 1, or 2; or R$^1$ is selected from the group consisting of —F, —CF$_3$, Cl, Br, and —OCF$_3$;
R$^2$ is selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl is substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, and R$^6$ are each independently selected from the group consisting of hydrogen and C$_{1-4}$alkyl, p is 0, 1, or 2; and
R$^3$ is selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl is substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, and R$^6$ are each independently selected from the group consisting of hydrogen and C$_{1-4}$alkyl, p is 0, 1, or 2; or R$^3$ is selected from the group consisting of

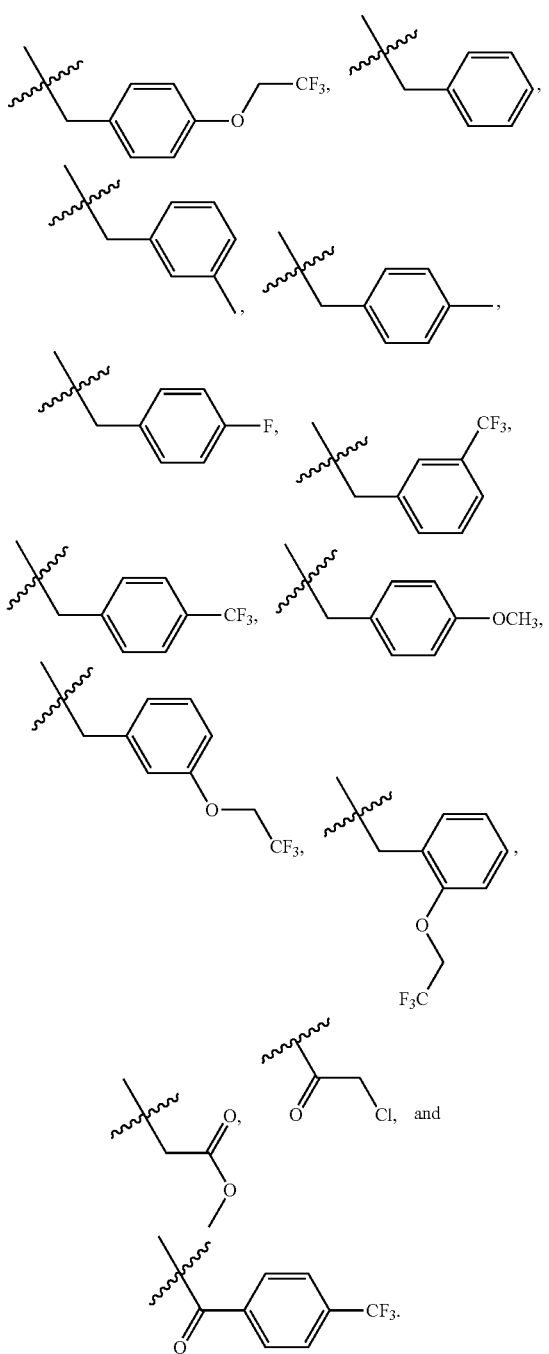

2. The triaromatic compound targeting bifunctional phosphorylation site of STAT3 according to claim 1, or the pharmaceutically acceptable salt thereof, wherein, W, Q, E, T, U, M, K, G and L are as defined in claim 1; and R$^1$, R$^2$ and R$^3$ are each independently selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl is substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, and R$^6$ are each independently select from hydrogen, or C$_{1-4}$alkyl, p is 0, 1, or 2.

3. The triaromatic compound targeting bifunctional phosphorylation site of STAT3 according to claim 1, or the pharmaceutically acceptable salt thereof, when W in the compound of formula (III) is O, and Q and E are N, the structure of the compound is represented by formula (IV):

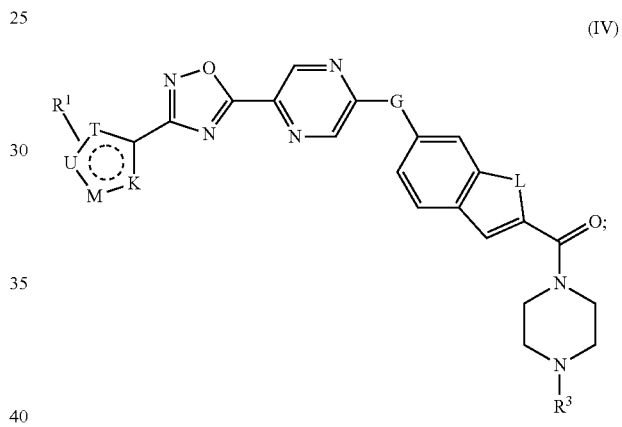

(IV)

wherein

T, U, M and K are each independently selected from the group consisting of CH, CH=CH, CH=NH, NH, N, O and S;

G and L are each independently selected from the group consisting of NH, NR$^2$, O, or S;

R$^1$, R$^2$ and R$^3$ are each independently selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl are each independently substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, and R$^6$ are each independently selected from hydrogen, or C$_{1-4}$alkyl, p is 0, 1, or 2.

4. The triaromatic compound targeting bifunctional phosphorylation site of STAT3 according to claim 1, or the pharmaceutically acceptable salt thereof, wherein the triaromatic compound is a compound of formula (IV);

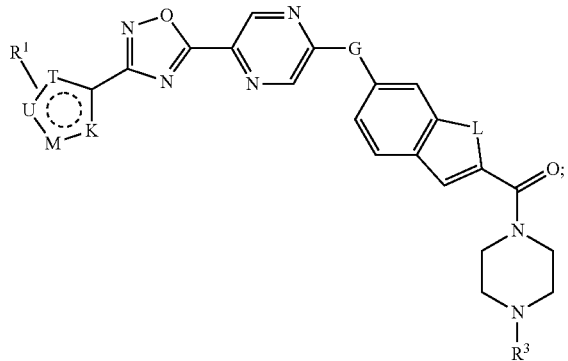

wherein

T, U, M and K are each independently selected from one of CH, CH=CH, CH=NH, NH, N, O or S; and G, L, R$^1$, and R$^3$ are as defined in claim 1.

5. The triaromatic compound targeting bifunctional phosphorylation site of STAT3 according to claim 3, or a pharmaceutically acceptable salt thereof, when ring

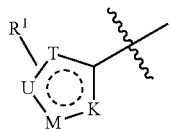

in formula (IV) is

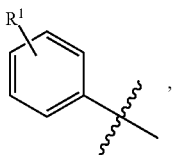

the structure of the compound is represented by formula (V):

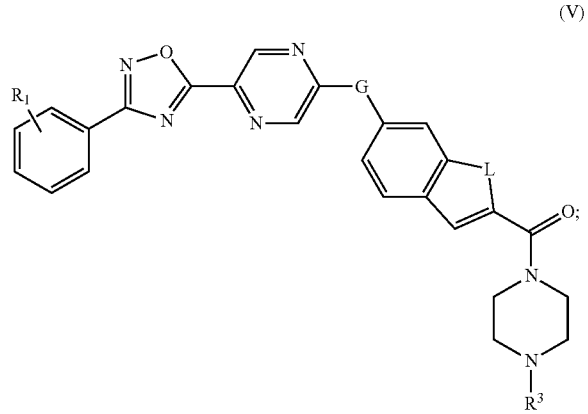

wherein

G and L are each independently selected from the group consisting of NH, NR$^2$, O, and S; and R$^1$, R$^2$ and R$^3$ are each independently selected from the group consisting of hydrogen, hydroxyl, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein the 5-10 membered heteroaryl is substituted with one or more substituents selected from the group consisting of halogen, hydroxyl, cyano, nitro, C$_{1-8}$alkyl, C$_{2-8}$alkenyl, C$_{2-8}$alkynyl, C$_{3-8}$cycloalkyl, 3-8 membered heterocyclyl, C$_{5-10}$aryl, 5-10 membered heteroaryl, C$_{1-6}$alkoxy, C$_{3-8}$cycloalkoxy, —S(O)pR$^4$, —C(O)R$^4$, —C(O)OR$^4$, —NR$^5$R$^6$, and —C(O)NR$^6$; wherein R$^4$, R$^5$, and R$^6$ are each independently selected from hydrogen or C$_{1-4}$alkyl, p is 0, 1, or 2.

6. The triaromatic compound targeting bifunctional phosphorylation site of STAT3 according to claim 1, or the pharmaceutically acceptable salt thereof, wherein the triaromatic compound is a compound of formula (V);

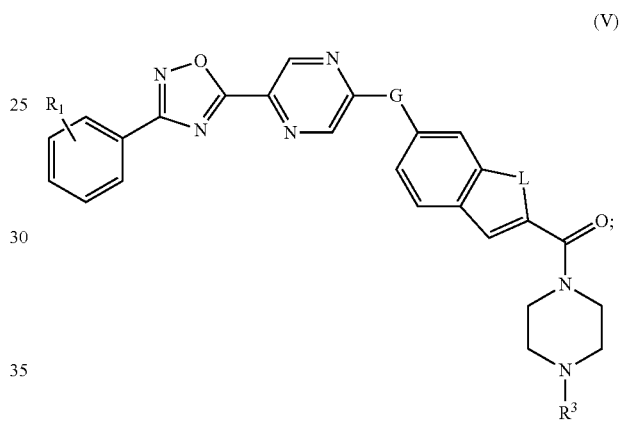

wherein

G, L, R$^1$, and R$^3$ are as defined in claim 1.

7. The triaromatic compound targeting bifunctional phosphorylation site of STAT3 according to claim 1, or the pharmaceutically acceptable salt thereof, wherein the triaromatic compound is selected from the group consisting of:

1-methyl-(6-((5-(3-phenyl-1,2,4-oxadiazol-5-yl) pyrazin-2-yl)oxy)-1H-indol-2-yl)(4-(4-(2,2,2-trifluoroethoxy) benzyl) piperazin-1-yl) methanone;

(6-((5-(3-(4-fluorophenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(2-fluorophenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(3-fluorophenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-methoxyphenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-(trifluoromethyl) phenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(2-(trifluoromethyl) phenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(3-(trifluoromethyl) phenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(2-methoxyphenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(3-methoxyphenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-chlorophenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-bromophenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-(trifluoromethoxyphenyl)-1,2,4-oxadiazol-5-yl) pyrazin-2-yl)oxy)-1-methyl-1H-indol-2-yl)(4-(4-(2,2,2-trifluoroethoxy) benzyl) piperazin-1-yl) methanone;

(6-((5-(3-(4-(trifluoromethyl) phenyl)-1,2,4-oxadiazol-5-yl) pyrazin-2-yl)oxy)-1H-indol-2-yl)(4-(4-(2,2,2-trifluoroethoxy) benzyl) piperazin-1-yl) methanone;

(1-ethyl-6-((5-(3-(4-(trifluoromethyl) phenyl)-1,2,4-oxadiazol-5-yl) pyrazin-2-yl)oxy)-1H-indol-2-yl)(4-(4-(2,2,2-trifluoromethoxy) benzyl) piperazin-1-yl) methanone;

(1-propyl-6-((5-(3-(4-(trifluoromethyl) phenyl)-1,2,4-oxadiazol-5-yl) pyrazin-2-yl)oxy)-1H-indol-2-yl)(4-(4-(2,2,2-trifluoromethoxy) benzyl) piperazin-1-yl) methanone;

(1-allyl-6-((5-(3-(4-(trifluoromethyl) phenyl)-1,2,4-oxadiazol-5-yl) pyrazin-2-yl)oxy)-1H-indol-2-yl)(4-(4-(2,2,2-trifluoromethoxy) benzyl) piperazin-1-yl) methanone;

(1-(2-methoxyethyl)-6-((5-(3-(4-(trifluoromethyl) phenyl)-1,2,4-oxadiazol-5-yl) pyrazin-2-yl)oxy)-1H-indol-2-yl)(4-(4-(2,2,2-trifluoroethoxy) benzyl) piperazin-1-yl) methanone;

2-methyl-1-(2-(4-(4-(2,2,2-trifluoroethoxy) benzyl) piperazin-1-carbonyl-6-((5-(3-(4-(trifluoromethyl) phenyl)-1,2,4-oxadiazol-5-yl) pyrazin-2-yl)oxy)-1H-indol-1-yl) propan-1-one;

Methyl 2-(2-(4-(4-(2,2,2-trifluoromethoxy) benzyl) piperazin-1-carbonyl-6-((5-(3-(4-trifluoromethyl) phenyl-1,2,4-oxadiazol-5-yl) pyridin-2-yl)oxy-1H-indol-1-yl) acetate;

Ethyl 2-(2-(4-(4-(2,2,2-trifluoromethoxy) benzyl) piperazin-1-carbonyl-6-((5-(3-(4-trifluoromethyl) phenyl-1,2,4-oxadiazol-5-yl) pyridin-2-yl)oxy-1H-indol-1-yl) acetate;

(1-benzyl-6-((5-(3-(4-(trifluoromethyl) phenyl)-1,2,4-oxadiazol-5-yl) pyrazin-2-yl)oxy-1H-indol-2-yl)(4-(4-(2,2,2-trifluoromethoxy) benzyl) piperazin-1-yl) methanone;

(4-benzylpiperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(3-methylbenzyl) piperazin-1-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(4-methylbenzyl) piperazin-1-yl) methanone;

(4-(4-fluorobenzyl) piperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(4-(4-chlorobenzyl) piperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(4-(4-bromobenzyl) piperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(3-(trifluoromethyl) benzyl) piperazin-1-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(4-(trifluoromethyl) benzyl) piperazin-1-yl) methanone;

(4-(4-methoxybenzyl) piperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(3-(2,2,2-trifluoroethoxy) benzyl) piperazin-1-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-(2-(2,2,2-trifluoroethoxy) benzyl) piperazin-1-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-methylpiperazin-1-yl) methanone;

(4-ethylpiperazin-1-yl)(1-methyl-6-((5-(3-(4-(trifluoromethyl) phenyl)-1,2,4-oxadiazol-5-yl) pyrazin-2-yl)oxy)-1H-indol-2-yl) methanone;

(1-methyl-6-((5-(3-(4-(trifluoromethyl) phenyl)-1,2,4-oxadiazol-5-yl) pyrazin-2-yl)oxy)-1H-indol-2-yl)(4-propylpiperazin-1-yl) methanone;

Methyl 2-(4-(1-methyl-6-((5-(3-(4-(trifluoromethyl) phenyl)-1,2,4-oxadiazol-5-yl) pyrazin-2-yl)oxy)-1H-indol-2-carbonyl) piperazin-1-yl) acetate;

2-chloro-1-(4-(1-methyl-6-((5-(3-(4-(trifluoromethyl) phenyl)-1,2,4-oxadiazol-5-yl) pyrazin-2-yl)oxy)-1H-indol-2-carbonyl) piperazin-1-yl) ethanone; and (1-methyl-6-((5-(3-(4-(trifluoromethyl) phenyl)-1,2,4-oxadiazol-5-yl) pyrazin-2-yl)oxy-1H-indol-2-yl)(4-(4-(trifluoromethyl) benzoyl) piperazin-1-yl) methanone.

8. A pharmaceutical composition, comprising the triaromatic compound targeting bifunctional phosphorylation site of STAT3 according to claim 1, or the pharmaceutically acceptable salt thereof, and pharmaceutically acceptable carriers.

9. The pharmaceutical composition according to claim 8, wherein the pharmaceutical composition further comprises a second agent.

10. The pharmaceutical composition according to claim 9, wherein the second agent is used for preventing and/or treating cancer, renal fibrosis, pulmonary fibrosis, rheumatoid arthritis, psoriasis, lupus erythematosus, inflammatory lung disease, and inflammatory bowel disease.

11. The pharmaceutical composition according to claim 8, wherein the pharmaceutical composition further comprises excipients, diluents, adjuvants, vehicles or combinations thereof.

12. The pharmaceutical composition according to claim 8, wherein the pharmaceutical compositions are in the form of tablets, capsules, injections, powder injections, powders, syrups, solutions, suspensions, or aerosols.

13. A method for inhibiting STAT3 or for inhibiting of phosphorylation of STAT3, transcriptional activity of STAT3, or oxidative phosphorylation of mitochondria, comprising administering to an individual in need thereof, or contacting cells, with the triaromatic compound targeting bifunctional phosphorylation site of STAT3 according to claim 1, or the pharmaceutically acceptable salt thereof.

14. A method for treating diseases caused or modulated by the activation of STAT3 bifunctional phosphorylation site or diseases associated with the activation of bifunctional phosphorylation site of STAT3 comprising administering to an individual in need thereof with an effective amount of the triaromatic compound targeting bifunctional phosphorylation site of STAT3 according to claim 1, or the pharmaceutically acceptable salt thereof;
- wherein the diseases is selected from the group consisting of pancreatic cancer, gastric cancer, liver cancer, lung cancer, prostate cancer, colon cancer, acute myelogenous leukemia, acute lymphocytic leukemia, chronic myelocytic leukemia, and chronic lymphatic leukemia.

15. The method according to claim 14, wherein the disease is selected from the group consisting of: pancreatic cancer, gastric cancer, liver cancer, lung cancer, prostate cancer, and colon cancer.

\* \* \* \* \*